US008134596B2

(12) United States Patent  
Lei et al.

(10) Patent No.: US 8,134,596 B2
(45) Date of Patent: Mar. 13, 2012

(54) CLASSIFYING AN OBJECT IN A VIDEO FRAME

(75) Inventors: Bangjun Lei, Delft (NL); Li-Qun Xu, Ipswich (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 1230 days.

(21) Appl. No.: 11/883,420

(22) PCT Filed: Feb. 6, 2006

(86) PCT No.: PCT/GB2006/000392
§ 371 (c)(1),
(2), (4) Date: Jul. 31, 2007

(87) PCT Pub. No.: WO2006/082429
PCT Pub. Date: Aug. 10, 2006

(65) Prior Publication Data
US 2010/0045799 A1    Feb. 25, 2010

(30) Foreign Application Priority Data
Feb. 4, 2005  (GB) .................................. 0502369.2

(51) Int. Cl.
*H04N 5/225*   (2006.01)

(52) U.S. Cl. ......................... 348/169; 348/739; 382/103

(58) Field of Classification Search .................. 348/169, 348/739; 382/103, 224
See application file for complete search history.

(56) References Cited

U.S. PATENT DOCUMENTS

| 5,414,643 | A | 5/1995 | Blackman et al. |
| 5,909,190 | A | 6/1999 | Lo et al. |
| 5,969,755 | A | 10/1999 | Courtney |
| 6,260,759 | B1 | 7/2001 | Nguyen et al. |
| 6,404,455 | B1 | 6/2002 | Ito et al. |
| 6,724,915 | B1 * | 4/2004 | Toklu et al. ................... 382/103 |
| 6,901,110 | B1 * | 5/2005 | Tsougarakis et al. .... 375/240.12 |
| 6,944,315 | B1 * | 9/2005 | Zipperer et al. ............... 382/103 |
| 6,956,603 | B2 * | 10/2005 | Fujii ............................. 348/169 |
| 7,436,887 | B2 * | 10/2008 | Yeredor et al. ........... 375/240.01 |
| 7,764,808 | B2 * | 7/2010 | Zhu et al. ...................... 382/103 |
| 7,804,506 | B2 * | 9/2010 | Bates et al. ................... 345/589 |

OTHER PUBLICATIONS

International Search Report mailed Apr. 26, 2006 in International Application No. PCT/GB2006/000392.

(Continued)

*Primary Examiner* — Philip B Tran
(74) *Attorney, Agent, or Firm* — Nixon & Vanderhye P.C.

(57) ABSTRACT

In a digital video surveillance system, a number of processing stages are employed to identify foreground regions representing moving objects in a video sequence. An object tracking stage (5) is also provided in order to identify a correspondence between candidate objects in a current frame and those that have already been identified in one or more previous frames. In this way, it is possible to calculate the path taken by the or each foreground object and to record this path information in a trajectory database. In order to improve tracking performance, the object tracking stage (5) employs a state transitional object management scheme which determines whether or not a particular object is tracked. The path information generated by the object tracking stage (5) can be displayed on a video monitor (15) of the surveillance system and/or made available to high level applications (7).

25 Claims, 16 Drawing Sheets

OTHER PUBLICATIONS

UK Search Report dated May 25, 2005 in Application No. GB0502369.2.

Tang et al., "An Adaptive Motion Correspondence Algorithm for Multiple Vehicle Tracking from an Air-Borne Platform," The IEEE 5th International Conference on Intelligent Transportation Systems, Sep. 3-6, 2002, pp. 49-54.

Veeraraghavan et al., "Combining Multiple Tracking Modalities for Vehicle Tracking at Traffic Intersections," Proceedings of the 2004 IEEE International Conference on Robotic & Automation, Apr. 2004, pp. 2303-2308.

Park et al., "Segmentation and Tracking of Interacting Human Body Parts Under Occlusion and Shadowing," Proceedings of the Workshop on Motion and Video Computing (MOTION'02), 202, 7 pages.

McKenna et al., "Tracking Groups of People," 2000, pp. 1-15.

Lipton et al., "Moving Target Classification and Tracking From Real-Time Video," IEEE, 1998, pp. 8-14.

* cited by examiner

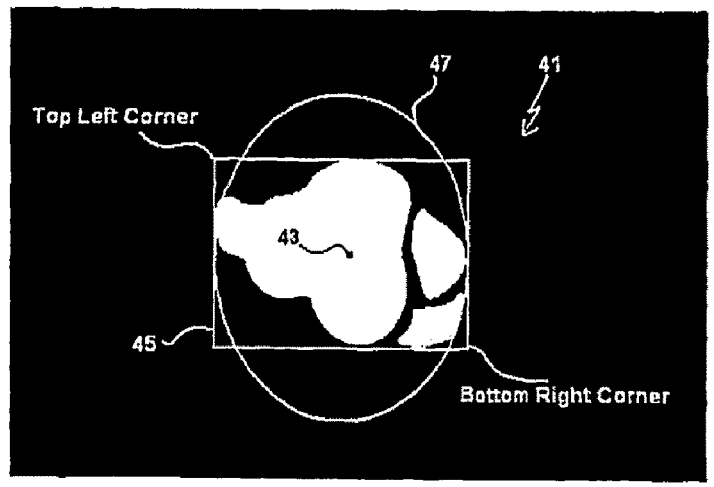
Figure 10
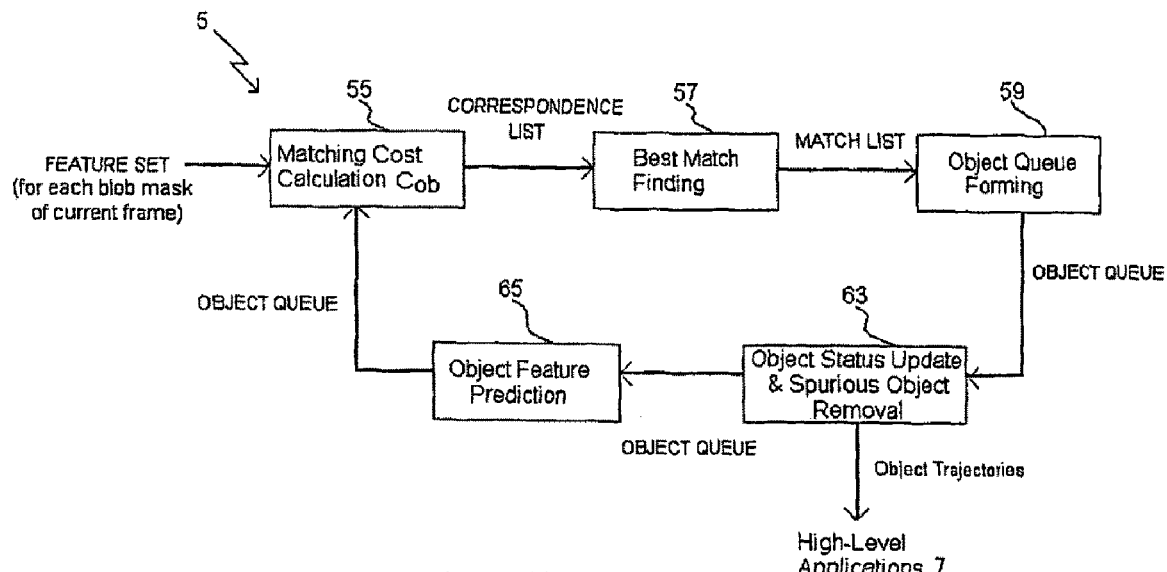
Figure 11
Figure 12

CLASSIFYING AN OBJECT IN A VIDEO FRAME

This application is the US national phase of international application PCT/GB2006/000392 filed 6 Feb. 2006 which designated the U.S. and claims benefit of GB 0502369.2, dated 4 Feb. 2005, the entire content of which is hereby incorporated by reference.

BACKGROUND AND SUMMARY

This invention relates to a method and apparatus for classifying an object in a video frame, the video frame comprising part of a video sequence. The invention also relates to a state-transitional object tracking scheme for determining the status of an object in a video frame.

Digital video processing is used in a wide range of applications. For example, modern video surveillance systems employ digital processing techniques to provide information concerning moving objects in the video. Such a system will typically comprise a video camera connected to a computer system via a direct or network link. The computer system runs software arranged to process and analyse video data supplied from the camera.

FIG. 1 is a block diagram showing the software-level stages of such a surveillance system. In the first stage 1, a background model is learned from an initial segment of video data. The background model typically comprises statistical information representing the relatively static background content. In this respect, it will be appreciated that a background scene will remain relatively stationary compared with objects in the foreground. In a second stage 3, foreground extraction and background adaptation is performed on each incoming video frame. The current frame is compared with the background model to estimate which pixels of the current frame represent foreground regions and which represent background. Small changes in the background model are also updated. In a third stage 5, objects, represented by the foreground regions, are tracked from frame to frame by identifying a correspondence between objects in the current frame and those tracked in previous frames. Meanwhile a trajectory database is updated so that the tracking history of each object is available to higher-level applications 7 which may, for example, perform behavioural analysis on one or more of the tracked objects.

After processing each video frame, a validity check 9 is performed on the background model to determine whether it is still valid. Significant or sudden changes in the captured scene may require initialisation of a new background model by returning to the first stage 1.

A known intelligent video system is disclosed in US Patent Application Publication No. 2003/0053659 A1. A known foreground extraction and tracking method is disclosed by Stauffer and Grimson in "Learning Patterns of Activity using Real-Time Tracking", IEEE Transactions on Pattern Analysis and Machine Intelligence, Volume 22, No. 8, August 2000.

Conventionally, the object tracking stage 5 operates on the assumption that the output from the foreground extraction stage 3 includes no noise or spurious artefacts, and that the motion of detected objects will be relatively simple. In practice, however, objects can appear and disappear at any place and at any time in a video sequence, especially if there is noise present in the system. Objects may disappear for a small number of frames and then reappear some time later. It is also possible for multiple objects to move across a scene of the video sequence, occlude one another, and then split apart. These situations can prevent the object tracking stage 5 making a correspondence between foreground regions in the current frame and those already identified in previous frames. As a result, tracking is lost and the tracking history is not accurate.

According to a first aspect of the present invention, there is provided a method for tracking an object appearing in a video sequence comprising a plurality of frames, each frame comprising a plurality of pixels, the method comprising: (a) identifying a first object in a first frame and associating therewith a first status parameter indicative of a non-tracking condition; (b) identifying a candidate object in a subsequent frame and determining whether there is a correspondence between the candidate object and the first object; (c) in the event of correspondence, repeating steps (b) and (c) for further subsequent frames until a predetermined number of sequential correspondences are identified; (d) changing the first status parameter to a second status parameter when said sequential correspondences are identified; and (e) in response to the change from first to second status parameter, recording the intra-frame position of said object for subsequent frames.

Preferred features of the invention are defined in the dependent claims appended hereto.

According to a further aspect of the invention, three is provided a video processing system for tracking an object appearing in a video sequence comprising a plurality of frames, each frame comprising a plurality of pixels, the system being arranged, in use, to; (a) identify a first object in a first frame and associating therewith a first status parameter indicative of a non-tracking condition; (b) identify a candidate object in a subsequent frame and determining whether there is a correspondence between the candidate object and the first object; (c) in the event of correspondence, repeat steps (b) and (c) for further subsequent frames until a predetermined number of sequential correspondences are identified; (d) change the first status parameter to a second status parameter when said sequential correspondences are identified; and (e) in response to the change from first to second status parameter, record the intra-frame position of said object for subsequent frames.

According to a further aspect of the invention, there is provided a method of classifying an object in a video sequence comprising a plurality of frames, the method comprising: (a) identifying a first object in a first frame and associating therewith a status parameter having one of a plurality of predetermined states, each state having a different transition rule associated therewith; (b) identifying at least one candidate object in a subsequent frame; (c) comparing the or each candidate object with the first object to determine if there is a correspondence therebetween; and (d) updating the status parameter of the first object in accordance with its associated transition rule, said transition rule indicating which of the predetermined states the status parameter should be transited to dependent on whether a correspondence was identified in step (c).

According to a further aspect of the invention, there is provided a method of classifying an object in a video frame comprising part of a video sequence, the method comprising; (a) identifying a first object in a first frame and associating therewith a status parameter having one of a plurality of predetermined states, each state having a different transition rule associated therewith; (b) identifying at least one candidate object in a subsequent frame; (c) comparing the or each candidate object with the first object to determine if there is a correspondence therebetween; and (d) updating the status parameter of the first object in accordance with its associated transition rule, said transition rule indicating which of the predetermined states the status parameter should be transited to dependent on whether a correspondence was identified in step (c).

By classifying an object as being in a particular state, it is possible to decide whether or not that object should be tracked. A predefined rule associated with the object is applied to determine the object's updated state following comparison with a candidate object in a subsequent frame. The updated state may reflect, for example, that the object is new, real, occluded or has disappeared from the subsequent frame, so that an appropriate rule can be applied when the next frame is received.

The method may further comprise repeating steps (b) to (d) for a plurality of subsequent frames of the video sequence.

The transition rule associated with the state may causes the status parameter to maintain its current state if there is no correspondence identified in step (c). The status parameter may have a new state or a real state, the transition rule associated with the new state causing the status parameter to be changed to the real state in the event that a correspondence is identified in step (c). The method may further comprise recording the position change between the first object and the corresponding candidate object only when the status parameter is in the real state.

The status parameter can be changed to the real state only if a correspondence is identified in a plurality of sequential frames in step (c).

The status parameter may be changed to the real state only if (i) a correspondence is identified in step (c) continuously for a predetermined time period, and (ii) extracted position characteristics of the object meet a set of predefined criteria. Step (ii) can comprise assigning a motion factor $\zeta_m$ to the first region based on its position characteristics over a plurality of video frames, and classifying said first object as meeting the predefined criteria if the motion factor is above a predetermined threshold $T_\zeta$. The motion factor $\zeta_m$ may be given by:

$$\zeta_m = \left( \frac{\sigma_{cx}^2}{\sigma_{vx}^2 + \tau} + \frac{\sigma_{cy}^2}{\sigma_{vy}^2 + \tau} \right) / 2$$

where $\sigma_{cx}^2$ and $\sigma_{cy}^2$ are the positional variances of the first object in the x and y directions, respectively, $\sigma_{vx}^2$ and $\sigma_{vy}^2$ are the velocity variances in x and y directions, respectively, and $\tau$ is a predetermined constant.

The method may further comprise displaying the corresponding candidate object in said subsequent frame together with an overlaid path line indicating the recorded position change between the first object and the corresponding candidate object. The status parameter may also have an occluded state, the transition rule associated with the real state causing the status parameter to be changed to the occluded state in the event that no correspondence is identified in step (c) and the first object overlaps a different region of interest appearing in the same frame.

The method may further comprise providing a first set of data representing appearance features $f_i^o$ of the first object, and extracting, for the or each candidate region in the subsequent frame, a second set of data representing appearance features $f_i^b$ of that respective object, step (c) comprising combining the first set of appearance data with the or each second set of appearance data in a cost function $C_{ob}$ thereby to generate a numerical parameter indicating the degree of correspondence between the first object and the or each new candidate region.

The cost function can be given by the following expression:

$$C_{ob} = \sqrt{\sum_{i=1}^{n} \frac{(f_i^o - f_i^b)^2}{\sigma_i^2}}$$

where $f_i^o$ represents an appearance feature of the first object, $f_i^b$ represents an appearance feature of the candidate region, $\sigma_i^2$ is the variance of $f_i^o$ over a predetermined number of frames and n is the number of appearance features in the first and second data sets.

The appearance features of the first object and the candidate object may include features relating to the frame position of the object and candidate object, and features relating to the shape of the object and candidate object. In the event of a correspondence being identified in step (c), the appearance features $f_i^o$ of the first object may be updated using the appearance features $f_i^b$ of the candidate object to which the first object corresponds.

According to a further aspect of the invention, there is provided a computer program stored on a computer-readable medium and comprising a set of instructions to cause a computer to perform the steps of (a) identifying a first object in a first frame and associating therewith a status parameter having one of a plurality of predetermined states, each state having a different transition rule associated therewith; (b) identifying at least one candidate object in a subsequent frame; (c) comparing the or each candidate object with the first object to determine if there is a correspondence therebetween; and (d) updating the status parameter of the first object in accordance with its associated transition rule, said transition rule indicating which of the predetermined states the status parameter should be transited to dependent on whether a correspondence was identified in step (c).

According to a further aspect of the invention, there is provided video processing apparatus comprising: an input for receiving frames of a video sequence; an object queue arranged to store data representing objects identified in one or more frames and, associated with each object, a status parameter representing one of a plurality of predetermined states; video analysis means arranged to receive a frame having one or more candidate objects therein, and to determine whether the or each candidate object matches an object in the object queue; and a state transition controller arranged to update the status parameter of each object in the object queue in accordance with a transition rule corresponding to the state of the object's status parameter, said transition rule indicating which of the predetermined states the status parameter should be transited to.

According to a further aspect of the invention, there is provided a state transition database for use with a video processing system storing information representing one or more objects identified in a video frame, each object being classified to one of a plurality of predefined object states, the database defining a plurality of different transition rules for each respective object state, the transition rules defining two or more updated states to which the object is transited depending on whether the object is matched with an object appearing in a subsequent frame.

BRIEF DESCRIPTION OF THE DRAWINGS

The invention will now be described, by way of example, with reference to the accompanying drawings in which:

FIG. 10 is a representation of a blob mask on which a number of extracted positional features are indicated;

FIG. 11 is a block diagram showing processing sub-stages of an object tracking stage of the surveillance system;

FIG. 12 is a table representing an object queue which is used in the object tracking stage;

DETAILED DESCRIPTION OF PRESENT EXAMPLE EMBODIMENTS

Figure 2:
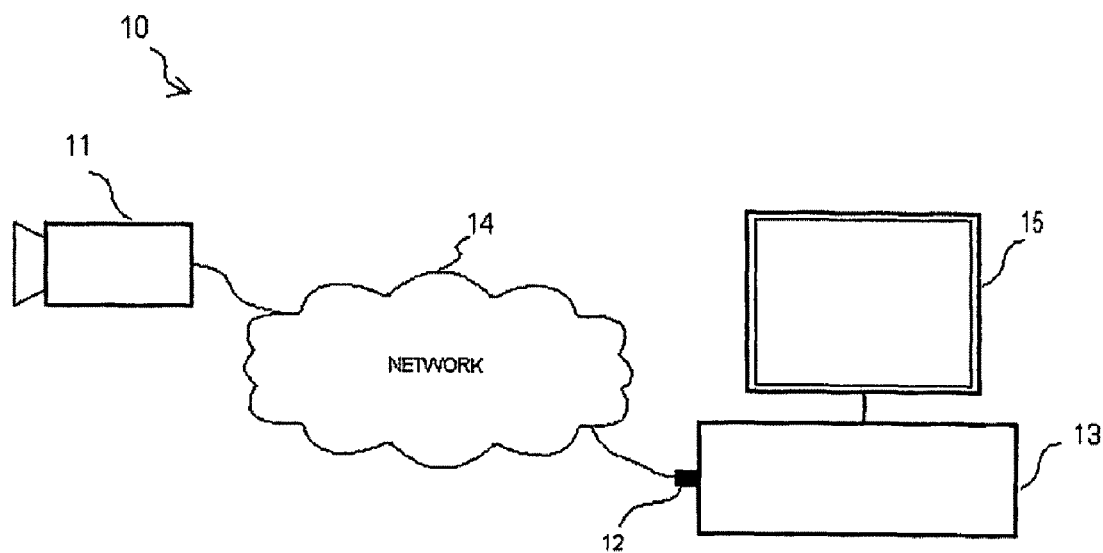
FIG. 2 is a block diagram showing components of an intelligent video surveillance system according to an embodiment of the invention.

Referring to FIG. 2, an intelligent video surveillance system 10 comprises a camera 11, a personal computer (PC) 13, and a video monitor 15. The camera 11 is a web camera, for example a Logitec™ Pro 4000 colour webcam. Any type of camera capable of outputting digital image data can be used, for example a digital camcorder or an analogue camera with analogue-to-digital conversion means. The web camera 11 communicates with the PC 13 over a network 14, which can be any network such as a Local Area Network (LAN) or the Internet. In practice, the web camera 11 and PC 13 are connected to the network 14 via respective network connections (not shown) such as Digital Subscriber Line (DSL) modems. Alternatively, the web camera 11 can be connected directly to the PC 13 by means of the PC's universal serial bus (USB) port 12. The PC 13 may comprise any standard computer. In this case, the PC 13 is a desktop computer having a 1 GHz processor, 512 Megabytes random access memory (RAM), and a 40 Gigabyte hard disk drive. The video monitor 15 is a 17" thin film transistor (TFT) monitor connected to the PC 13 by a standard video connector.

Video processing software is provided on the hard disk drive of the PC 13. The software is arranged to perform a number of processing operations on video data received from the web camera 11. The video data represents individual frames of captured video, each frame being made up of a plurality of picture elements, or pixels. In this embodiment, each frame has a display format of 320 pixels (width) by 240 pixels (height). Alternative display formats may be used depending on the application. Since the web camera 11 is a colour camera, each pixel is represented by data indicating the pixel's position in the frame, as well as the respective weightings of the three colour components, namely red, green and blue components, which determine the displayed colour. As will be understood in the art, the luminance Y of a given pixel may be approximated by the following expression:

$$Y = \alpha.R + \beta.G + \gamma.B \quad (1)$$

where $\alpha = 0.114$, $\beta = 0.587$, and $\gamma = 0.299$.

R, G and B respectively represent the values of the red, green and blue colour components. Although alternative expressions for Y are known, the applicant has found the above expression to be preferable.

Figure 1:
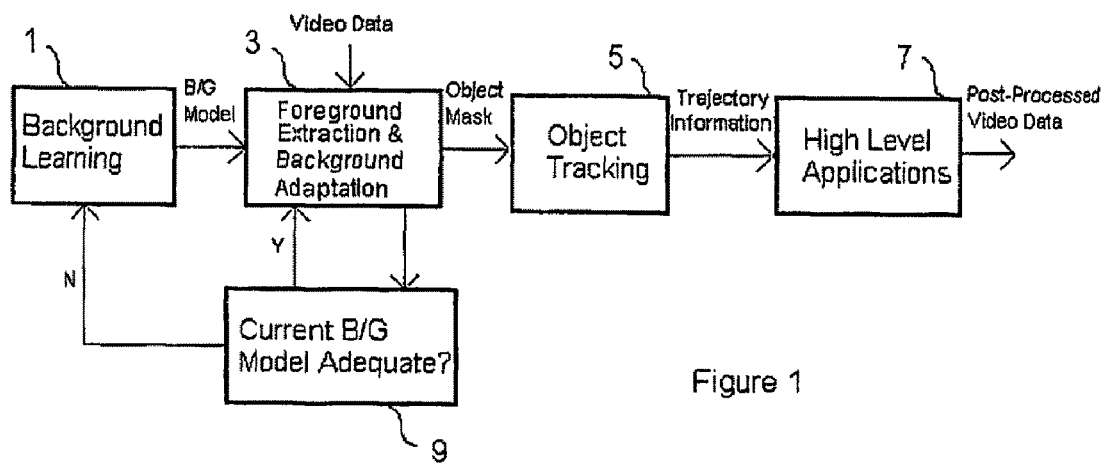
FIG. 1 is a block diagram showing processing stages of a conventional intelligent video system.
Figure 3:
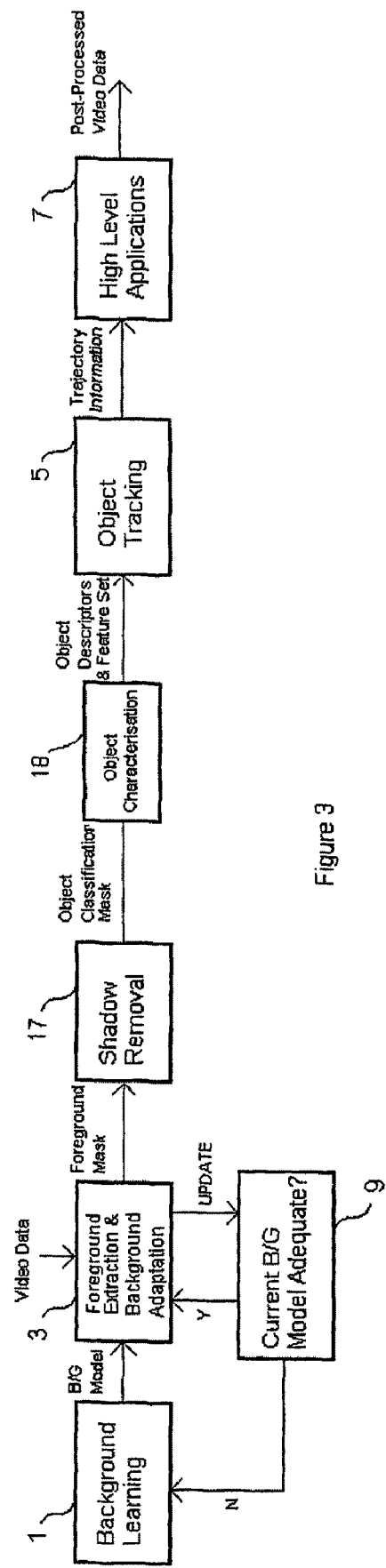
FIG. 3 is a block diagram showing processing stages of the surveillance system shown in FIG. 2.

The video processing software comprises a number of stages, as shown in FIG. 3. FIG. 3 is similar to FIG. 1 with the addition of a shadow removal stage 17 and an object characterisation stage 18, both stages being incorporated between the foreground extraction stage 3 and the object tracking stage 5.

The purpose of the shadow removal stage 17 is to remove shadow and highlight regions from each video frame. In this way, subsequent processing stages, which identify the shape of foreground regions, are able to operate with improved reliability. The inclusion of the shadow removal stage 17 is not essential to the invention but serves to provide improved operation.

The purpose of the object characterisation stage 18 is to extract a so-called feature set for each foreground region identified in video frames. The feature set comprises a plurality of predetermined features which are used, in a subsequent step, for matching objects in the current video frame with objects identified in previous video frames.

Background Learning

The video processing software initially runs a background learning stage 1. The purpose of this stage is to establish a background model from an initial segment of video data. This video segment will typically comprise one hundred frames. Since the background scene of any image is likely to remain relatively stationary (compared with foreground objects) this stage establishes a background model in which no foreground objects should be visible.

Figure 4:
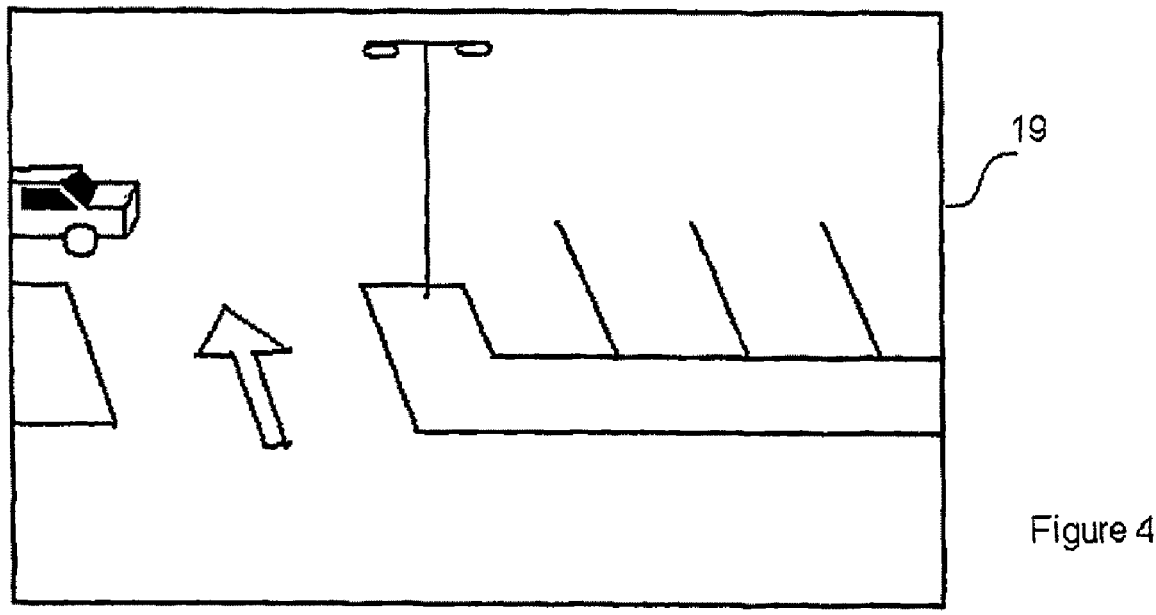
FIG. 4 is a representation of a background model used in a foreground extraction stage of the surveillance system.

FIG. 4 shows a background model 19. In this case, the web camera 11 was oriented towards a car park. In the memory of the PC 13, the background model 19 is represented by a set of stored data representing the pixel's position, and the respective weightings of the red, green and blue colour components of each pixel.

Having established the background model 19, incoming video frames are received by the PC 13 and are processed by the video processing software. The subsequent foreground extraction stage 3, shadow removal stage 17, object characterisation stage 18, object tracking stage 5, and the high level applications 7 process the video frames in real time.

Foreground Extraction and Background Adaption

The foreground extraction and background adaptation stage 3 (hereafter referred to as 'the foreground extraction stage') analyses each pixel of the current frame. Each pixel is compared with the pixel occupying the corresponding position in the background model 19 to estimate whether the pixel of the current frame represents part of a foreground object or background. Small changes in the background model 19 are updated dynamically. More severe or sudden changes in the background model 19 require a relearning operation, which is performed using the test indicated by reference numeral 9.

Although a detailed explanation of the foreground extraction stage 3 is not essential for understanding the invention, the skilled person will appreciate that there are known methods for performing foreground extraction 3. Perhaps the simplest is to compare the luminance of each pixel with that of the pixel occupying the corresponding position in the background model 19. If the difference between the two is above a predetermined threshold, the current pixel is classified as a foreground pixel.

A particularly effective method is the so-called Mixture of Gaussian (MoG) method which is described in detail by Stauffer & Grimson in 'Learning Patterns of Activity Using Real-Time Tracking', IEEE Transactions on Pattern Analysis and Machine Intelligence, Volume 22, No. 8, August 2000, pp. 747-757. An implementation of the MoG method is also described in US Patent Application Publication No. 2003/0053658. A further MoG method for establishing a background model and performing foreground extraction is disclosed in the applicant's co-pending UK patent application no. 0425937.0. The full contents of this UK application, or foreign equivalents thereof, are incorporated herein by reference. All references describe a background learning method that is suitable for establishing the above-mentioned background model 19.

In summary, the MoG method involves modelling each pixel of an incoming video frame as a mixture of different Gaussian (or normal) statistical distributions. This reflects the assumption that samples of the same scene point are likely to show Gaussian noise distributions. The mixture of normal distributions reflects the expectation that more than one process may be observed over time. Based on the persistence and variance of each of distribution of the mixture, it is determined which distributions correspond to the current background. Pixels that do not fit the background distributions are classified as foreground pixels until there is a distribution that does correspond and which is supported by consistent evidence built up over a number of frames.

In the case of the embodiments described herein, the foreground extraction stage 3 preferably operates using the MoG method. However, this is by no means essential and alternative methods can be used.

Figure 5:
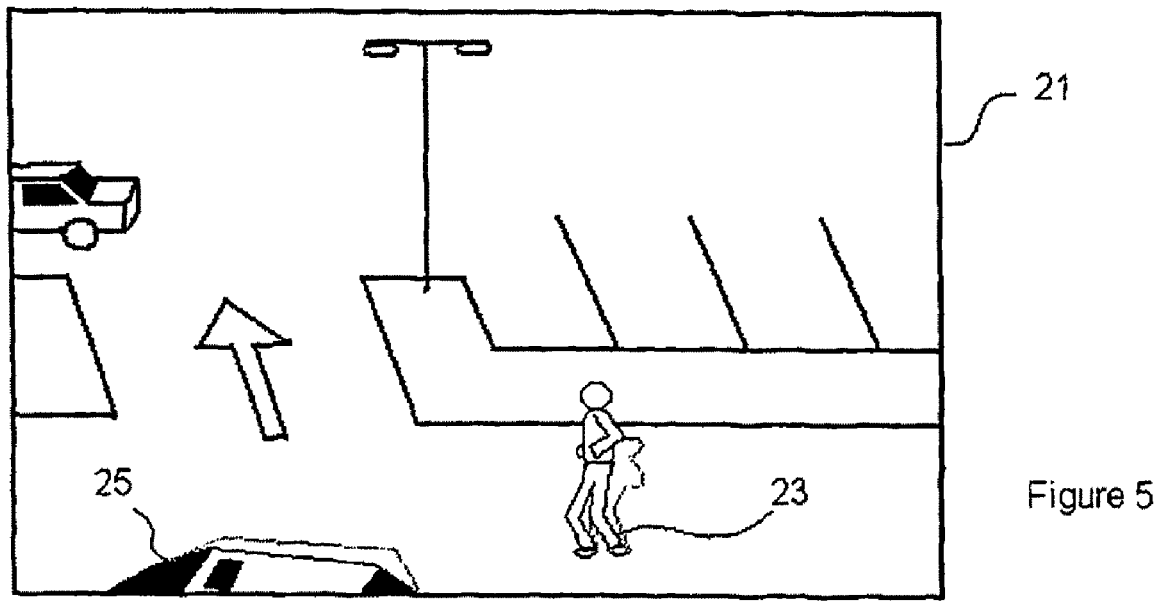
FIG. 5 is a representation of an incoming video frame to the foreground extraction stage.
Figure 6:
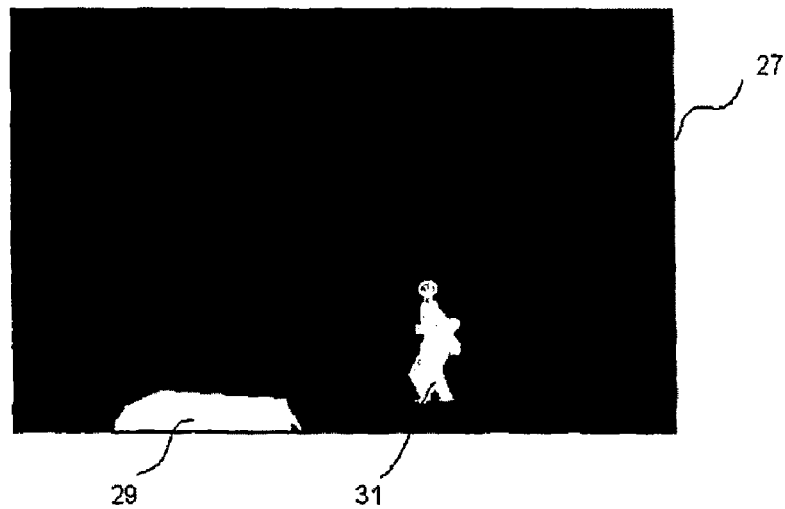
FIG. 6 is a representation of a foreground mask generated by the foreground extraction stage.

The operation of the foreground extraction stage 3 is better understood by referring to FIG. 5 which shows an incoming video frame 21 from the web camera 11. The video frame 21 depicts (a) a person 23 walking across the car park, and (b) a vehicle 25 crossing the lower part of the car park. Each pixel of the video frame 21 is compared with the corresponding pixel in the background model 19 to determine whether the pixel should be classified as a foreground pixel or a background pixel. As a result, the foreground extraction stage 3 generates a foreground mask. A mask is a set of image data that includes information concerning the classification of each pixel, i.e. whether it represents foreground or background. Referring to FIG. 6, a visual representation of the foreground mask 27 is shown in which foreground pixels are shown in white and background pixels are shown in black.

The foreground mask 27 includes first and second foreground regions 29, 31. However, neither foreground region 29, 31 is particularly well defined in terms of its shape and, using the foreground mask 27 alone, it is difficult to determine which foreground objects are actually represented. This is caused by shadows which, as shown in FIG. 5, are cast by the person 23 and vehicle 25 onto the background. Pixels representing the shadows have a darker intensity than pixels occupying the corresponding position in the background model 19. Accordingly, these pixels have been wrongly classified as foreground pixels. The presence of highlights can cause a similar problem.

As a consequence of shadows and highlights, problems may occur in subsequent processing stages. If, for example, the object characterisation stage 18 receives the foreground mask 27 directly from the foreground extraction stage 3, it may have difficulty identifying certain features of a foreground object. The object tracking stage 5 may have difficulty making a correspondence between foreground objects in the current frame and those tracked in previous frames. A similar problem may occur if the video surveillance system 10 includes an object classification stage in which objects are classified according to which 'real-world' object their respective mask profile resembles.

In order to mitigate the above-mentioned problems, the video processing software includes a shadow removal stage 17.

Shadow Removal.

Figure 7:
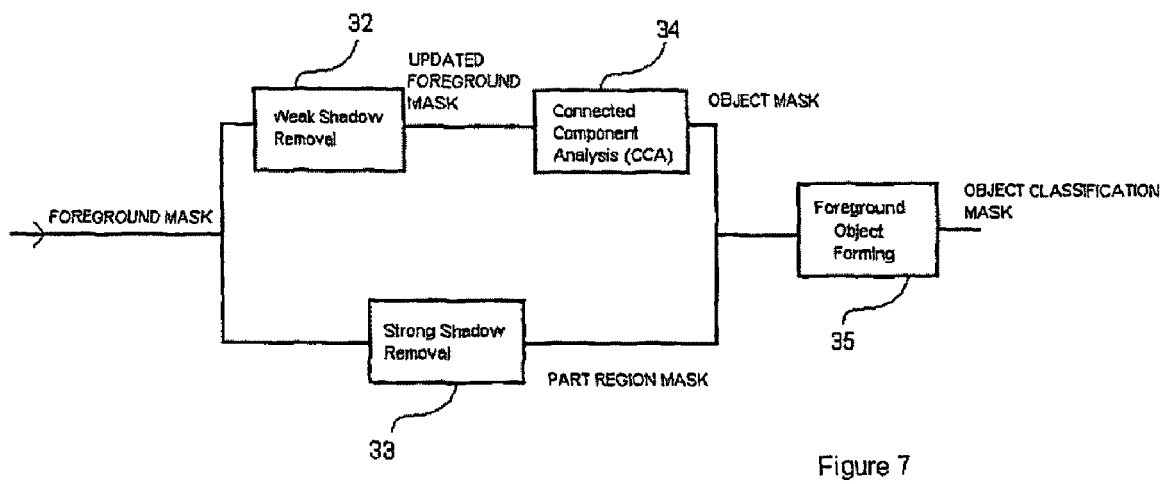
FIG. 7 is a block diagram showing functional elements of a shadow removal stage of the surveillance system.

FIG. 7 shows the main functional elements of the shadow removal stage 17. A two-branch process is employed, comprising weak shadow removal 32 and strong shadow removal 33. Both operate in parallel on the foreground mask 27, and generate therefrom, respectively, an update mask and a part region mask.

It should be understood that parallel operation is not essential to the invention. However, for the purposes of this real-time video surveillance system 10, parallel operation is preferred.

The purpose of weak shadow removal 32 is to remove only the most severe shadows present in the current frame. In effect, it is assumed that there are only a few highly distinguishable shadows present. On its own, however, weak shadow removal 32 will be insufficient since the frame is, in reality, likely to have a number of shadows of varying intensity. As a result, it is likely that a number of pixels will still be wrongly classified as foreground pixels.

Conversely, the purpose of strong shadow removal 33 is to remove substantially every shadow present in the current frame. As a result, it is likely that some true foreground areas will be incorrectly detected as shadow regions. Objects that cast shadows onto themselves, so-called self-shadows, are particularly vulnerable. For example, a frame showing a human face may include a self-shadow region cast by the nose onto the cheek. Strong shadow removal 33 will cause this region to be removed despite the pixels of this region actually forming part of the foreground object, i.e. the face. The result is usually a fragmented image in which parts of the same object appear detached from one another. Subsequent processing steps may interpret each fragment as a separate object.

The shadow removal stage 17 uses the output from both weak and strong shadow removal 29, 30 to generate a so-called object classification mask. The object classification mask comprises the part region mask, which provides an improved representation of foreground object shapes, with additional classification information to ensure that, where appropriate, fragmented objects parts are identified as belonging to a common object. To achieve this, a connected component analysis (CCA) operation 34 is employed on the update mask following weak shadow removal 32. The CCA operation generates an object mask that is sent to a foreground object forming stage 35. The operation of the CCA stage 34 and the foreground object forming stage 35 will be described below.

The purpose of the CCA operation 34 is to identify one or more clusters of image pixels in the updated foreground mask. A cluster may comprise two or more adjacent, or connected, pixels. Following this, a boundary defining the smallest rectangular area enclosing each cluster is automatically established by the software. The position of each rectangular area on the frame is added to the first update mask to form the object mask.

Figure 8B:
FIGS. 8a-8h are representations of mask images generated at different operating phases of the shadow removal stage.
Figure 8D:
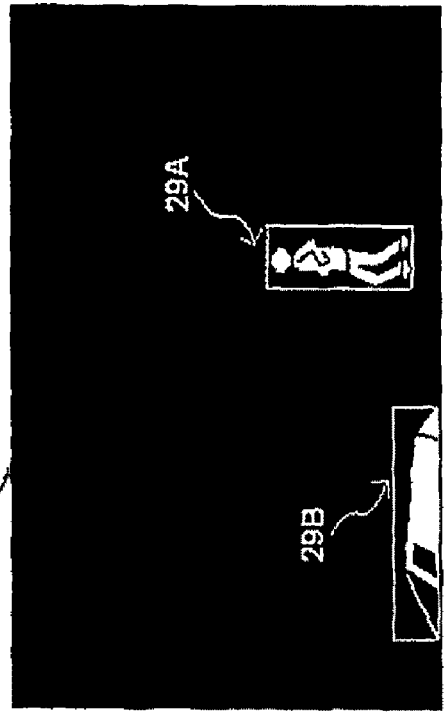
Figure 8A:
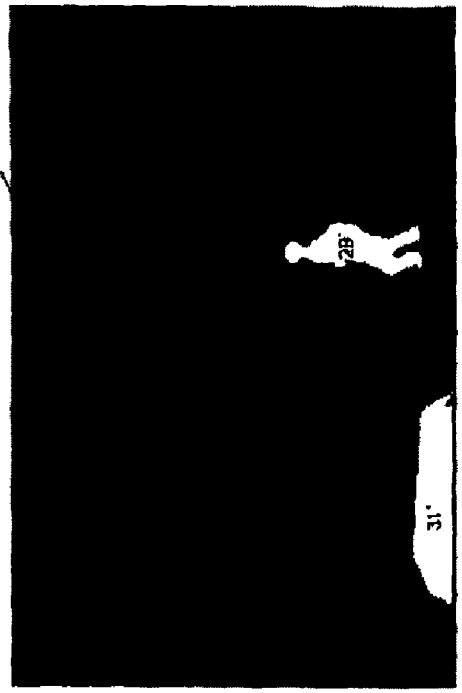

To illustrate the above process, we assume the foreground mask 27 shown in FIG. 6 to be the current input to the shadow removal stage 17. FIG. 8a shows the updated foreground mask 36 resulting from weak shadow removal 32. As anticipated, although some shadows have been removed, the shape of each object 29', 31' remains poorly defined. FIG. 8b shows the object mask 37 generated by the CCA stage 34 in which rectangular boundaries have been added enclosing the respective clusters 29' and 31'.

Figure 8C:
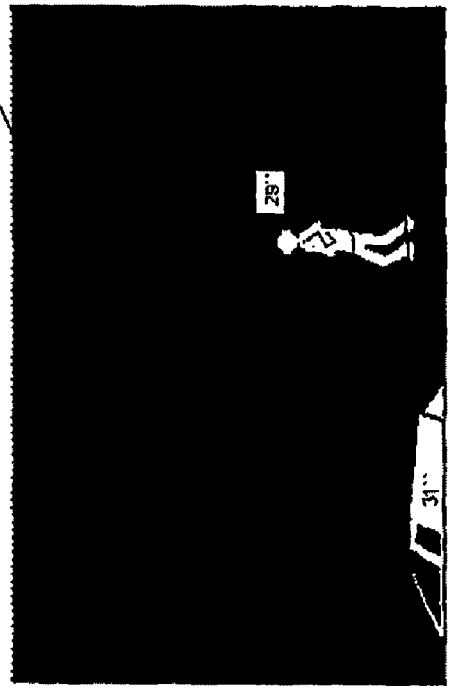

FIG. 8c shows the part region mask 38 following strong shadow removal 33. It will be noted that the shape of each object 29", 31" is better defined. However, strong shadow removal 33 has inevitably resulted in some foreground pixels being incorrectly classified as background pixels and each object has been fragmented into a number of separate parts.

In the foreground object forming stage 35, the object mask 37 and the part region mask 38 are compared to identify foreground pixels in the part region mask 38 whose position falls within a common rectangular area of the object mask 37. All foreground pixels that fall within a common rectangular area are classified as belonging to the same foreground object. Each of the two rectangular areas is referred to as a blob mask.

As mentioned above, the output generated by the foreground object forming stage 35 is referred to as the object classification mask 39. The object classification mask 39 provides an improved shape representation of foreground objects using strong shadow removal 33. Potential problems, due to the fragmentation of foreground regions, are avoided by assigning a common identity to each part falling within a given boundary region, the size of which is determined by weak shadow removal 32. FIG. 8d shows a visual representation of an object classification mask 39, containing the two blob masks resulting from the foreground object forming stage 35.

Figure 8E:
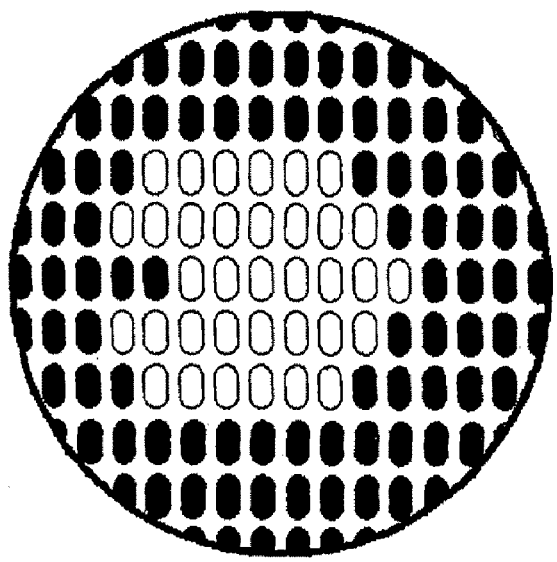
Figure 8F:
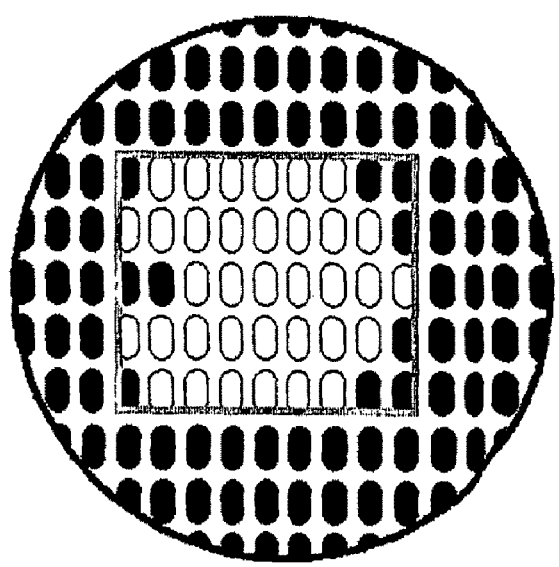
Figure 8G:
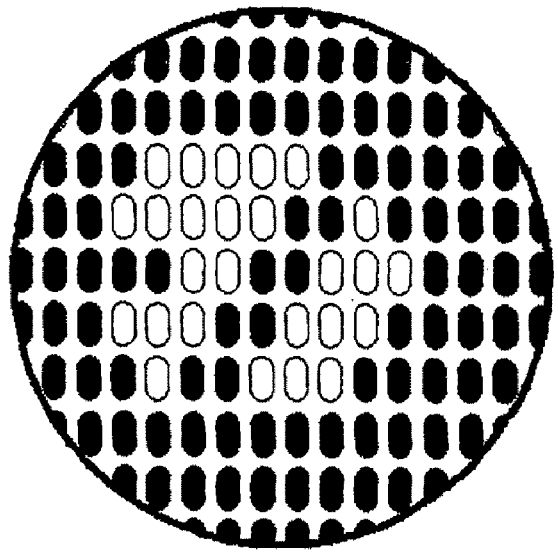
Figure 8H:
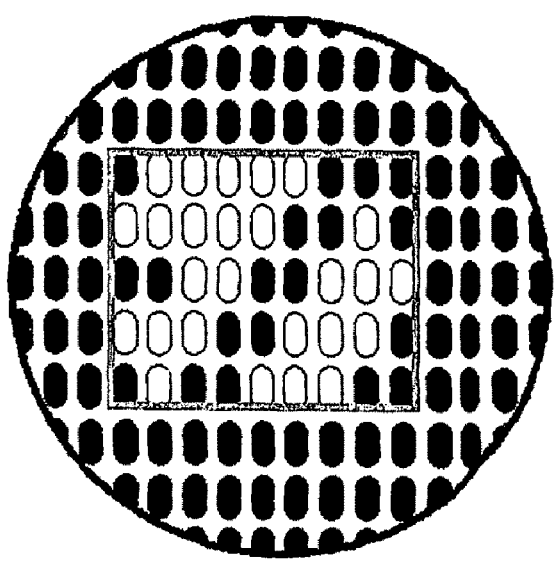

The operating principle of the CCA stage 34 and the object forming stage 35 is better understood by referring to FIGS. 8e to 8h. FIG. 8e shows a close-up portion of a foreground mask following weak shadow removal 32. A single cluster of foreground pixels is present. FIG. 8f shows a close-up portion of an object mask generated by the CCA stage 34. The CCA stage 34 has defined a rectangular boundary just large enough to enclose each foreground pixel. FIG. 8g shows a close-up portion of a part region mask following strong shadow removal 33. Rather than a single cluster of foreground pixels being present, there are two separate clusters. FIG. 8h shows a close-up portion of an object classification mask following the foreground object forming stage 35. All foreground pixels in the part region mask which fall within the rectangular boundary defined by the CCA stage 34 have been classified as representing a common foreground region.

Further details of the shadow removal stage, including software-level operation, is disclosed in the applicant's co-pending UK patent application no. 0424030.5. The entire contents of this UK application, or foreign equivalents thereof, are incorporated herein by reference.

Object Tracking

Up to now, the description of the video processing software has concentrated on stages arranged to identify possible foreground regions in the incoming video frames and to mitigate the effects of shadows and highlights by means of the shadow removal stage 17. This section describes the operation of the following stage, namely the object tracking stage 5.

The output from the shadow removal stage 17 is video data representing the object classification mask, which itself may comprise one or more blob masks each of which will represent the shape of a possible (or 'candidate') foreground object. In the object classification mask 39 shown in FIG. 8d, two blob masks 29A, 29B are present, representing, respectively, the shape of a person and a vehicle. The object tracking stage 5 is arranged to identify a correspondence between blob masks in the current frame and those that have already been identified in one or more previous frames. In this way, it is possible to calculate the path taken by the or each foreground object and to record this path information in a trajectory database. The path information can be displayed on the video monitor 15 and/or made available to high level applications 7 which are configured, for example, to perform behavioural analysis based on the path taken by an object.

Figure 9:
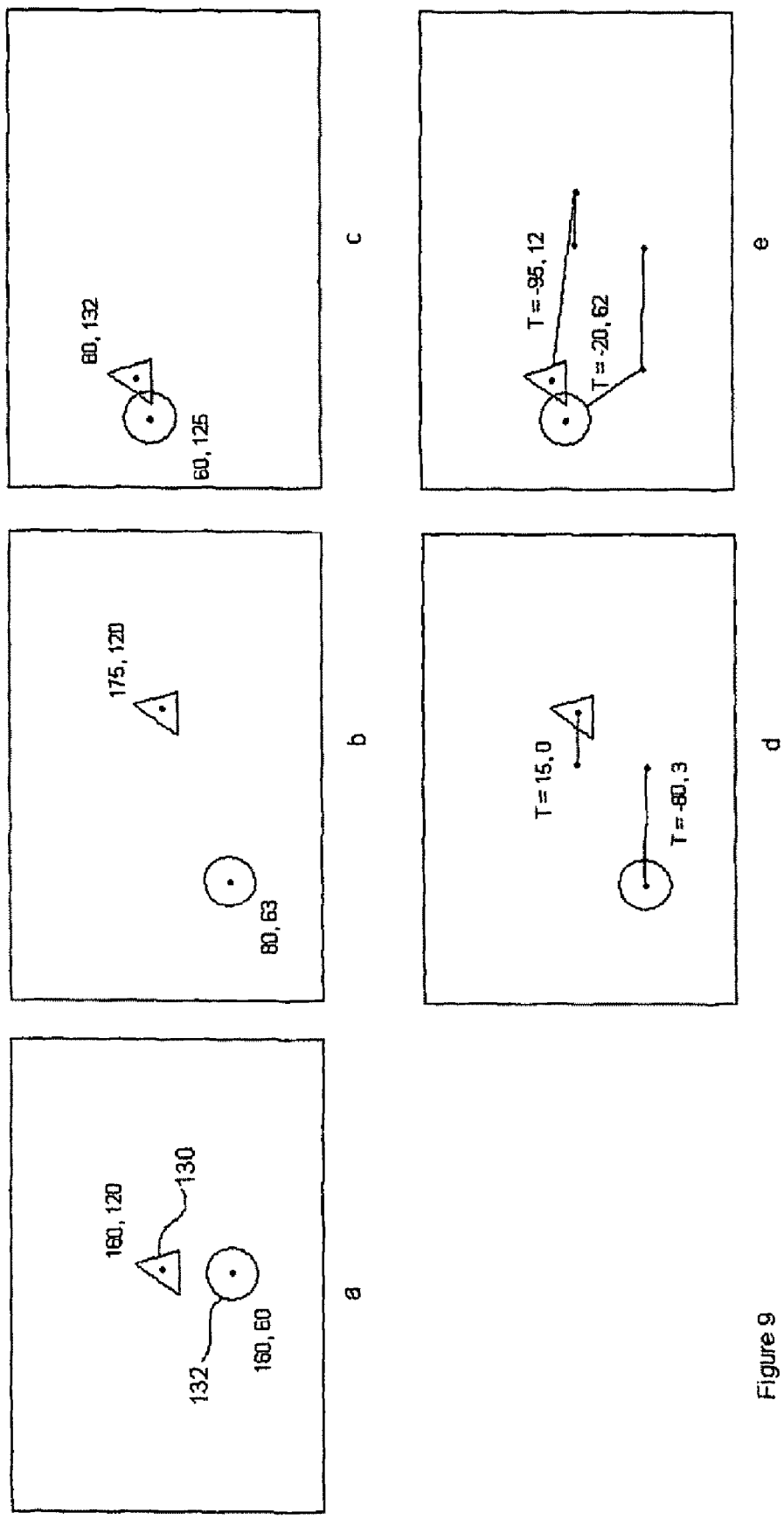
FIG. 9a-9e show, in schematic, the process of tracking two different objects appearing in a plurality of video frames.

The principle of object tracking is shown in FIG. 9. Referring to FIG. 9a, first and second objects 130, 132 are shown in a first frame, the frame position of each respective object being indicated by the Cartesian co-ordinates. FIGS. 9b and 9c respectively show the first and second objects 130, 132 in second and third subsequent frames of a video sequence. It will be noted that both objects 130, 132 have changed position in each frame, indicating object motion. In the object tracking stage 5 described below, the trajectory vector taken by each object 130, 132 is calculated and the path represented by the trajectory vector displayed. FIGS. 9d and 9e show the path associated with each object 130, 132 following receipt of the second and third frames respectively, FIG. 9e here indicating the cumulative path for all three frames. The Cartesian coordinates representing the calculated trajectory vectors are also indicated.

In order to track each blob mask, it is first necessary to establish a correspondence, or match, between blob masks in the current frame and those identified in previous frames. For clarity purposes, blob masks that have been identified in previous frames are hereafter referred to as 'objects'. As will be explained in detail below, a matching cost $C_{ob}$ is assigned to each combination of blob mask and object, the cost indicating the degree of match between each pairing. The matching cost $C_{ob}$ is calculated using a feature-based correspondence metric. As will be understood by those skilled in the art, feature-based correspondence metrics involve extracting a plurality of features from each object and using these features in a cost function to identify a match with an incoming blob mask. As an alternative, a template-based correspondence metric can be used, this method employing an appearance template, e.g. in the form of a histogram or colour block, and in which incoming blob masks are compared with each template to find a match. As the number of blob masks and objects increase, template-based methods tend to be time consuming and so, for this reason, a feature-based method is preferable.

The first stage in the feature-based correspondence method is to extract predetermined features from each blob mask of the incoming frame. This is performed by the object characterisation stage 18, as indicated in FIG. 3. The plurality of features comprise a 'feature set' associated with each blob mask. Table 1 lists the features of the feature set, these features having been selected following extensive experiments to identify those features providing appropriate results in comparison operations. The features are grouped into four main sets, namely position, shape, colour and velocity features. The right-hand column relates to a Kalman filter algorithm that is employed in a position feature updating process, as will be explained further on.

TABLE 1

Feature Set extracted by Object Characterisation Stage 18.

| Type | Feature $f_i$ | Meaning | Kalman Prediction |
|---|---|---|---|
| Position | $(x_c^o, y_c^o)$ | Position of object o centre | Second order |
|  | $(x_l^o, y_l^o)$ | Top-left corner of object o bounding box | First order |
|  | $(x_r^o, y_r^o)$ | Bottom-right corner of object o bounding box | First order |
| Shape | $(l_x^o, l_y^o)$ | Axes lengths of object o bounding ellipse | No |
|  | $n_p^o$ | Number of object o pixels | No |
|  | $A^o$ | Size of object o bounding box | No |
| Colour | $(c_I^o, c_J^o, c_K^o)$ | Principal colour of object o (A single colour chosen to represent the main appearance of the whole object. This can be extracted using the known principal component analysis (PCA) technique.) | No |
| Velocity | $(v_x^o, v_y^o)$ | Velocity of blob motion - the first derivative of $(x_c^o, y_c^o)$ and computed after sufficient frames have been received. |  |

Referring to FIG. 10, the positional features of a blob mask 41 are indicated. The centre position feature 43 is the centre of mass/gravity of the blob mask 41. Also shown is the bounding box 45 and the object bounding ellipse 47, the latter being sufficient in size to enclose all pixels within its circumference. The bounding box 45 is the smallest rectangle enclosing all foreground pixels of the blob mask 41. The remainder of the features are self-explanatory.

Having generated a feature set for each blob mask, each feature set is thereafter received by the object tracking stage 5. The operation of the object tracking stage 5 will now be described with reference to FIG. 11.

As shown in FIG. 11, the object tracking stage 5 comprises a number of sub-stages 55, 57, 59, 63, 65. In the first sub-stage 55, the above-mentioned matching cost $C_{ob}$ is calculated for each combination of (a) incoming blob mask and (b) objects stored in an object queue. The object queue holds data relating to objects that have been identified in previous frames, or, more correctly, a predetermined number of previous frames. Referring to FIG. 12, there is shown a representation of an object queue 71. It will be noted that, as well as storing the feature set associated with each object, a number of other parameters are also present, including a status parameter, a tracking record parameter (TR) and a lost record parameter (LR).

In a second sub-stage 57, matches between blob masks and objects are identified. In a third sub-stage 59, the object queue 71 is updated based on the results of the previous stage. This involves replacing the non-positional features of matched objects with corresponding features of the blob mask to which they matched. The positional features are not updated at the third sub-stage 59. In a fourth sub-stage 63, the status parameter associated with each object in the object queue 71 may be updated using a state-transitional object management scheme. The state-transitional object management scheme comprises a set of rules which determine the status of an object based on a number of characteristics. The status of an object determines whether the object is to be tracked, deleted, or have its status parameter changed. As part of the state-transitional object management scheme, objects may also be checked to determine whether or not they represent a spurious object, as opposed to a genuine foreground object likely to be of interest to a user. In a fifth sub-stage 65, object feature prediction updates the positional features of matched objects using a Kalman filter algorithm (discussed below). The object queue 71 is fed back to the first sub-stage 55, and the matching cost calculation for the next set of blob masks is performed using the updated feature set for each object in the object queue.

As mentioned above, in the fifth sub-stage 65, a Kalman filter algorithm updates the position features of matched objects in the object queue 71. More specifically, the algorithm predicts the respective values of the next frame's three pairs of position features. This reflects the fact that, in order to successfully match an object in the object queue 71 with an incoming blob mask that (due to its motion) may occupy a different position in the frame, it is advantageous to predict and update the position features prior to performing the matching cost calculation in the first sub-stage 55. The Kalman filter algorithm is a recursive algorithm commonly used in visual processing systems and its concept should be well understood by those skilled in the art. Further information on the Kalman filter is disclosed in "An Introduction to the Kalman Filter" by Greg Welch and Gary Bishop, SIGGRAPH 2001 Course 8, Computer Graphics, Annual Conference on Computer Graphics & Interactive Technicques, ACM Press, Addison-Wesley, Los Angeles, Calif., USA, August 2001 Course Pack. This document is currently available at http://www.cs.unc.edu/~tracker/media/pdf/SIGGRAPH2001 CoursePack 8.pdf.

Referring to the right-hand column in table 1, it will be noted that the centre position feature $(x_c^o, y_c^o)$ is predicted using a second order Kalman filter. This allows us to predict a velocity feature $(v_x^o, v_y^o)$ for each blob. The velocity feature $(v_x^o, v_y^o)$ is the first derivative of the centre position feature and is used in the state-transitional object management scheme employed in the fourth sub-stage 63.

The remaining non-positional features of the feature set are updated in the third sub-stage 59 by replacing their current value with the corresponding feature value of the blob mask with which they match. Since the Kalman filtering process is computationally intensive, this serves to save memory and processing power.

Each of the above-mentioned sub-stages will now be described in further detail.

In the first sub-stage 55, a matching cost function $C_{ob}$ is assigned to each blob mask using the following metric:

$$C_{ob} = \sqrt{\sum_{i=1}^{n} \frac{(f_i^o - f_i^b)^2}{\sigma_i^2}}$$

or $$C_{ob} = \sqrt{\frac{(x_c^o - x_c^b)^2}{\sigma_c^2} + \frac{(y_c^o - y_c^b)^2}{\sigma_c^2} + \frac{(x_i^o - x_i^b)^2}{\sigma_i^2} + \frac{(y_i^o - y_i^b)^2}{\sigma_i^2} + \frac{(x_r^o - x_r^b)^2}{\sigma_r^2} + \frac{(y_r^o - y_r^b)^2}{\sigma_r^2} + \ldots}$$

(2)

This metric is commonly known as the Mahalanobis distance metric and combines all features from a blob mask feature set $f_i^b$, and an object feature set $f_i^o$ stored in the object queue 71, into one convenient cost function $C_{ob}$ (where the covariance matrix is assumed to be an identity matrix). The parameter $\sigma_i$ is the standard deviation of $f_i^o$ calculated over previous observations. Preferably, the number of previous observations is fifty frames, although under initial conditions the standard deviation will obviously use fewer observations until fifty frames have been received. The lower the value of the cost function $C_{ob}$, the better a match between a blob mask and an object.

Figure 13:
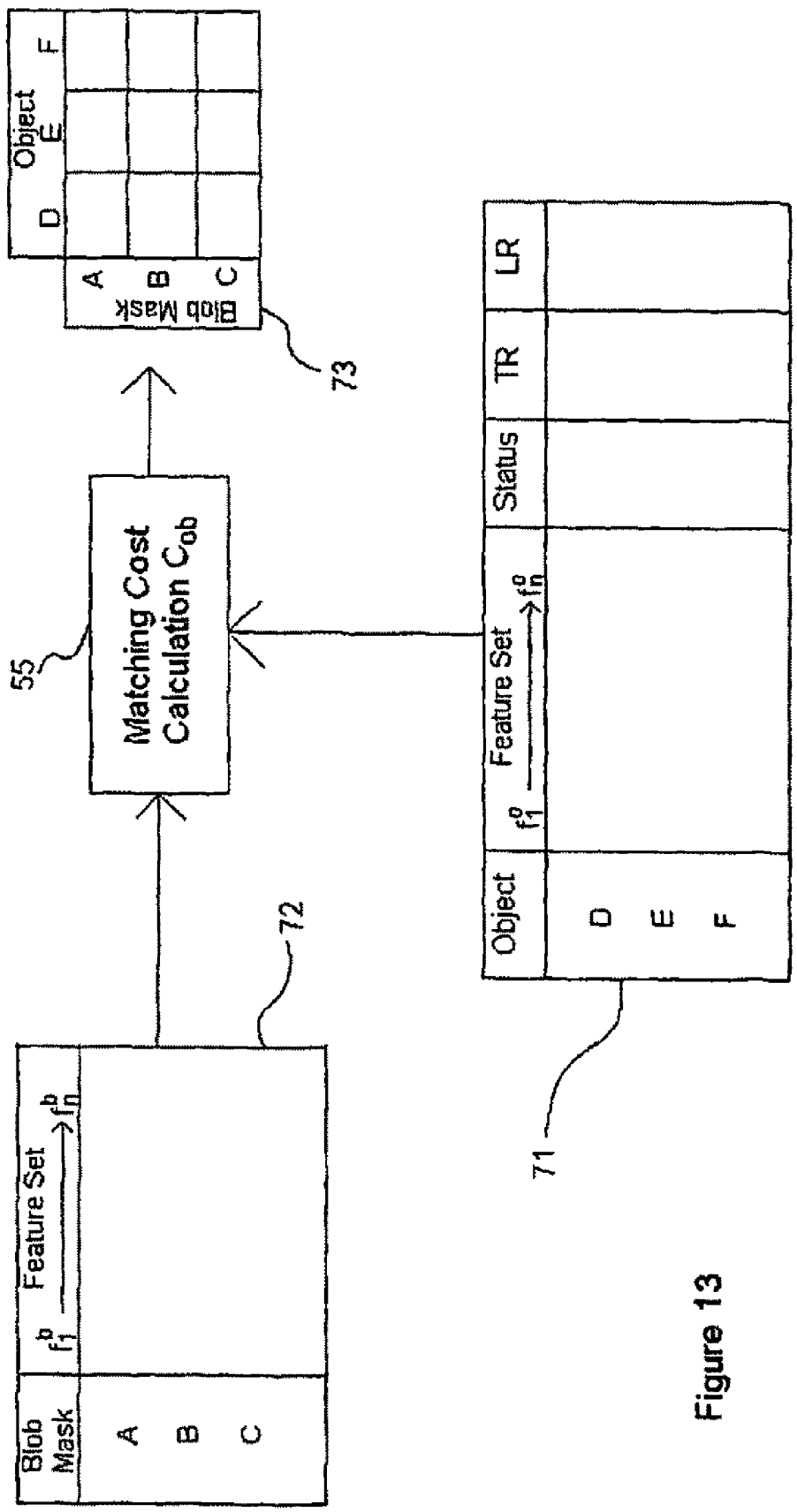
FIG. 13 is a schematic representation of a matching cost processing sub-stage in the object tracking stage.

The cost function $C_{ob}$ is calculated for each combination of (a) blob masks in the current frame and (b) object stored in the object queue 71. This operation is illustrated in FIG. 13 which shows both the object queue 71 and a feature set list 72 associated with three blob masks. The blob masks are labelled A, B and C and the objects are labelled D, E and F. As indicated in FIG. 12, the output from the first sub-stage 55 is a 'correspondence list' which can be represented as a grid indicating the result of each pairing. Table 2 (below) is an exemplary correspondence list for a matching cost calculation involving an incoming frame having three blob masks A, B and C, and an object queue storing three objects D, E and F. The figures shown in the grid are the cost functions $C_{ob}$ for each respective pairing.

TABLE 2

| Correspondence List | | | | |
|---|---|---|---|---|
| | | \multicolumn{3}{c}{Objects in Object Queue} | | |
| | | D | E | F |
| Blob Masks | A | 8 | 1 | 9 |
| b | B | — | 8 | 3 |
| | C | 2 | 7 | 9 |

A threshold $T_c$ is set on the value of the cost function $C_{ob}$. Specifically, if $C_{ob}$ is above $T_c$, e.g. twelve, then the value is not entered in the correspondence list. A large value of $C_{ob}$ indicates a low possibility of correspondence between feature sets and so we may immediately discard any pairing producing a relatively large value of $C_{ob}$. This reduces the amount of processing required. As will be seen from the example above, the cost function $C_{ob}$ for the pairing of blob mask B and object D is above twelve and so the value is not entered into the correspondence list.

To further reduce the amount of processing required, an early-jump strategy is employed such that the cost function $C_{ob}$ is calculated progressively. As the value of $C_{ob}$ increases with each new feature comparison, $C_{ob}$ is compared with $T_c$. If $C_{ob} > T_c$ then the calculation immediately stops and the current pairing is not entered into the correspondence list.

In the second sub-stage 57, best match finding is performed using the correspondence list. A global search is performed to identify the pairing with the lowest cost function $C_{ob}$. In the above example, the pairing of blob mask A and object E results in the lowest cost. This pairing is considered 'matched' and any other pairing involving either blob mask A or object E, i.e. A & D, A & F, B & E and C & E, is removed from the correspondence list. This process repeats until the correspondence list is empty. The end result is a so-called 'match list' that indicates which objects correspond with each blob mask. Table 3 shows the match list resulting from the above example.

TABLE 3

| Match List based on Correspondence List of Table 2 | |
|---|---|
| Blob Mask | Object in Object Queue |
| A | E |
| B | F |
| C | D |

In the above example, each blob mask has been matched with an object in the object queue. However, there are two other scenarios that can result from the best match finding stage 57. In the event that a blob mask fails to match any object in the object queue, in which case the cost function $C_{ob}$ will be above $T_c$ for all object comparisons, it may be assumed that the blob mask represents a 'new' object in the video sequence. If there is an object in the object queue that fails to match any blob mask, it may be assumed that the object has 'disappeared' from the video sequence. The terms 'new' and 'disappeared' represent two types of object status which can be stored under the status heading in the object queue. As will become clear below, we can employ different tracking strategies on objects having differing states in order to perform tracking more effectively and efficiently. In particular, we use the state of an object to decide whether or not to record the tracking history of that object.

In the third sub-stage 59, the object queue is updated. As mentioned previously, this includes updating non-positional features for those objects in the queue that have matched incoming blob masks.

In the fourth sub-stage 63, the state of each object is monitored and updated as necessary. More specifically, each object is assigned a state which, depending on its value, determines whether or not the object is to be tracked and/or whether it is to be deleted from the object queue. The state assigned to an object is determined by a state-transitional object management scheme which takes account of the various scenarios that can occur within a video sequence. Two different state-transitional object management schemes will now be described.

Simple Tracking Scheme

If we assume that our video sequence comprises a number of objects that will not occlude one another (occlusion meaning that all or part of an object is hidden from view by another object) then a relatively simple tracking scheme can be employed. This tracking scheme is represented by the state-transitional object management scheme shown in FIG. 14 and is applied to each object stored in the object queue 71 at the fourth sub-stage 63.

Figure 14:
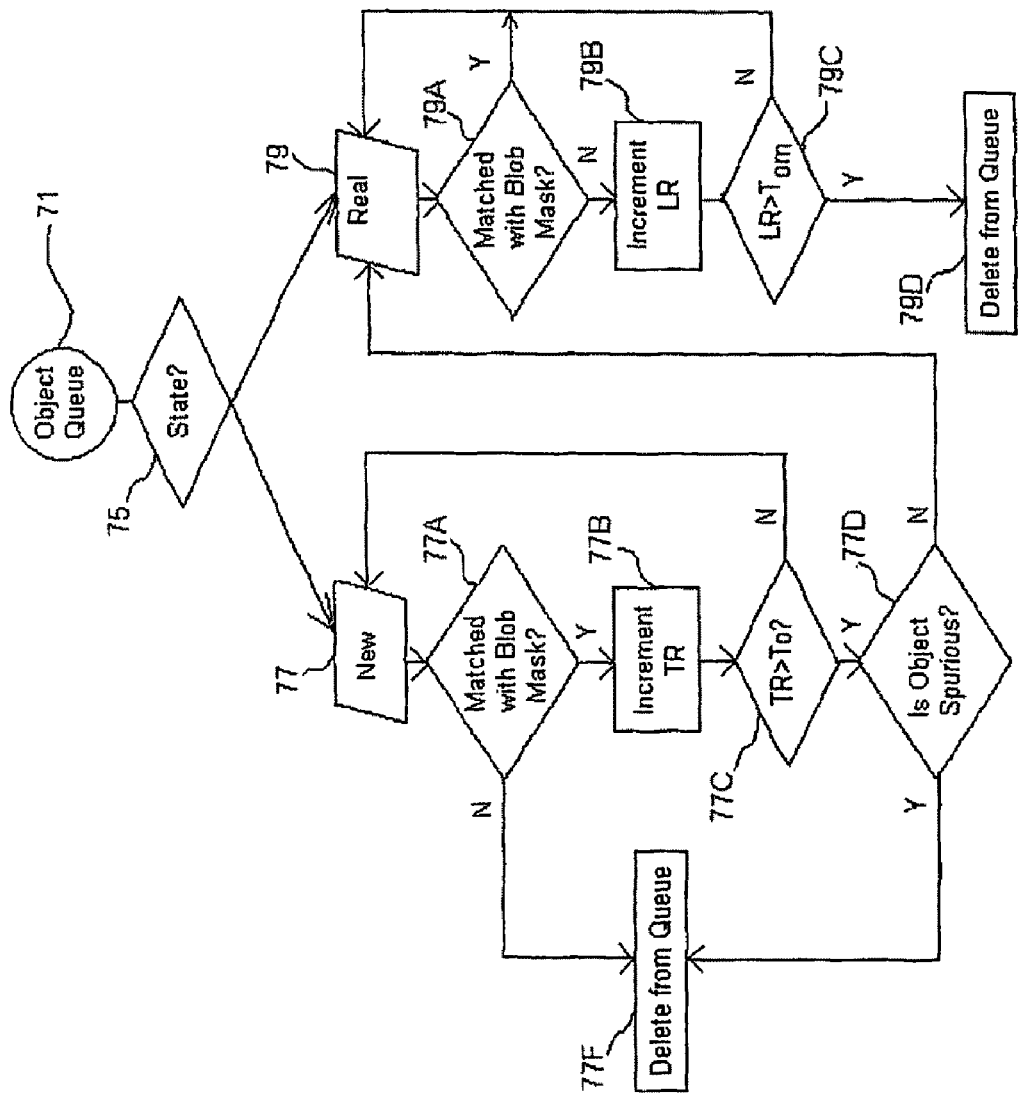
FIG. 14 is a flow chart showing a plurality of object states and the transition rules associated with each respective state.

Referring to FIG. 14, each object in the object queue 71 will occupy one of two main states, namely 'new' or 'real'. A 'new' object is defined as an object that has not matched an incoming blob for a predetermined number of frames $T_o$. In this embodiment, $T_o$ is set to ten frames. Once the 'new' object has matched an incoming blob continuously for $T_o$ frames, it is then considered 'real' and its position is recorded for tracking purposes. On the other hand, if an object does not match an incoming frame, it is removed from the object queue 80.

The current state of an object is defined by its status parameter in the object queue 71. Taking each step of the flow chart in turn, in a first step 75, the status of the object determines which additional steps will be applied to the object over this frame period. If the object is currently classified as 'new' and matches an incoming blob mask, as determined in step 77A, the TR parameter is incremented in step 77B. In the following step 77C, a test is performed to determine if TR is greater than $T_o$. If so, a further test is applied in step 77D to determine whether the object is spurious (this test is described in detail below). If the object is considered spurious, it is deleted from the object queue in step 77F. If the object is not considered spurious, the status parameter in the object queue is changed to 'real'. If the result of step 77C is negative, the status parameter in the object queue 71 is maintained as 'new'.

If the object is currently classified as 'real' and has matched an incoming blob mask, its status parameter is maintained as 'real'. If there is no match in step 79A, the LR parameter is incremented in step 79B. In the following step 79C, it is determined whether LR is greater than $T_{OM}$ which will be indicative that the object has not matched an incoming blob mask for, in this case, five frames. If so, the object is deleted from the object queue in step 79D. If not, the status parameter in the object queue is maintained as 'real'.

Any object in the object queue 71 which is classified as 'real' is tracked. This is performed by means of recording the co-ordinates of each 'real' object within the frame and calculating the trajectory taken by the object as more and more frames are received. This trajectory information is stored in a trajectory database which makes the trajectory information available for display or for processing by higher-level applications 7. Preferably, an object having 'real' status is displayed on the video monitor 15 surrounded by a bounding box. The trajectory information is used to plot a trail line indicating the cumulative path taken by the object. If multiple objects are being tracked, the trail lines can be plotted in different respective colours.

Spurious Object Identification

As part of the fourth sub-stage 63, spurious object identification is performed on each 'new' object in the object queue, as indicated by step 77D in FIG. 14. Specifically, the fourth sub-stage 63 analyses the motion characteristics of each object to determine whether or not that object represents a spurious foreground region. In this respect, the operation of the foreground extraction stage 3 can result in certain image regions being classified as foreground even though they do not represent foreground objects of interest to a user. As such, it is worthwhile identifying these objects so that subsequent processing operations are not performed on them.

There are a number of reasons why spurious regions can be generated in the foreground extraction stage 3. The presence of repetitive motion, such as the movement of leaves or branches on a tree, is a common cause. Since the leaves are moving with respect to the background model, the pixels representing the leaves can be classified as foreground pixels. Nevertheless, the pixels of this region do not represent true foreground and so such a region is generally considered spurious. The video processing software is also likely to introduce noise into the overall system. Noisy pixels can be interpreted by the foreground extraction stage 3 as foreground pixels. In either case, it is not desirable to waste processing and memory resources recording the trajectories of spurious regions. For this reason, spurious object identification is employed to identify and thereafter remove any object considered to be spurious.

Figure 15A:
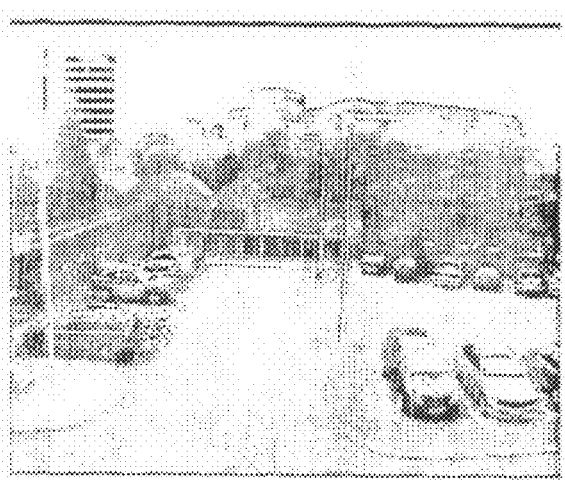
FIGS. 15a-15c are images received by the surveillance system at different processing stages, the images being useful for understanding the operation of the object tracking stage.
Figure 15B:
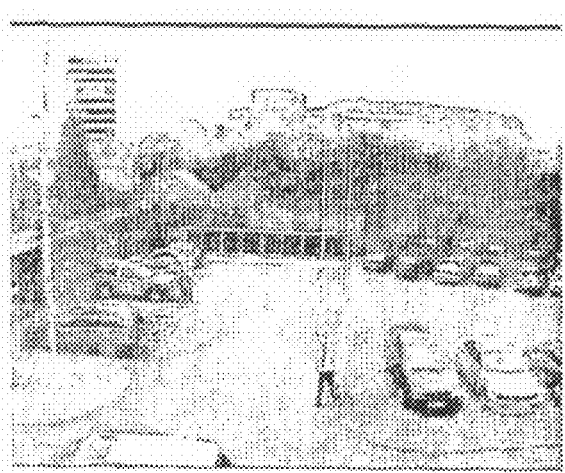
Figure 15C:
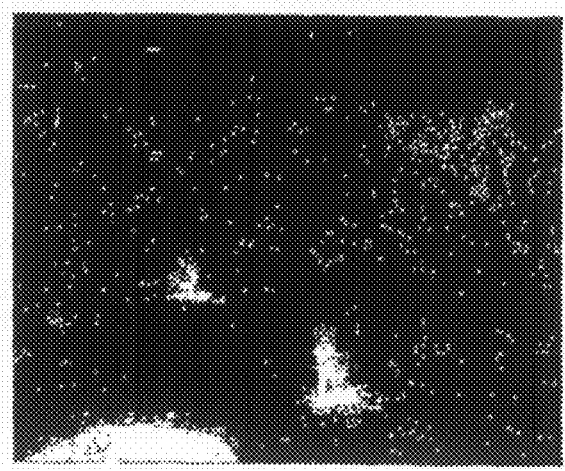

To illustrate the effect of noise and/or random motion in a scene, reference is made to FIGS. 15a to 15c. FIG. 15a shows a background model generated in the background learning stage 1. The background model shows a car parking area with no moving objects present. FIG. 15b shows an incoming video frame in which three foreground objects are present, namely a person walking across the car park, a vehicle exiting the car park and a person walking in the vicinity of a vehicle at the left-hand side of the frame. FIG. 15c shows the foreground mask following foreground extraction. Pixels representing the three above-mentioned objects have been correctly classified as foreground regions. These regions are of interest for surveillance purposes and the trajectories of these regions should be tracked by the object tracking stage 5. However, a number of other white areas are present, particularly in the region of the trees to the upper right of the frame. These white areas represent pixels which have been classified as foreground even though they do not represent any visible foreground object. These are examples of spurious regions, the presence of which is due to noise and random motion of the trees. Clearly, tracking of these objects is not desirable.

In order to identify spurious regions, the motion exhibited by each 'new' object in the object queue 80 is monitored. It is noted that certain motion characteristics, when measured over a plurality of frames, can be indicative of the random motion and/or noise effects which commonly given rise to spurious effects. Accordingly, in step 85 of the object management scheme of FIG. 14, the video processing software is operable to detect objects having these motion characteristics so that appropriate action can be taken, e.g. by way of deleting these blob masks from the object queue 80.

As a first example, in most surveillance applications, it is unlikely that a real foreground object exhibiting little or no movement will suddenly appear in a frame. This is likely to indicate a spurious region caused by quantization error in the video codec. Thus, any object in the object queue that has near zero motion and which is classified as 'new' is considered spurious. The object is preferably removed from the object queue 71, or at least prevented from being changed to a 'real' object even if it has been tracked for a sufficient period of time.

In order to measure the amount of motion exhibited by an object, the software monitors the position of the centre point $(x_c^b, y_c^b)$ of the object over a plurality of frames. This information is available from the feature set information in the object queue 80. The motion of the centre point $(x_c^b, y_c^b)$ can also be defined by the variance $(\sigma_{cx}^2, \sigma_{cy}^2)$ of the centre point position, the variance being derived from values acquired over previous frames. In this case, 'new' objects with a near-zero variance of centre point position are regarded as spurious.

As a second example, objects which are generated by random effects, such as noise or other phenomena (e.g. waving leaves) usually exhibit random motion. This type of motion will exhibit a large variance of the centre point position ($\sigma_{cx}^2$, $\sigma_{cy}^2$) and an even larger variance in the velocity ($\sigma_{vx}^2$, $\sigma_{vy}^2$) of the centre point position. In this case, step 85 requires calculation of both the change (or variance) in centre point position and the change (or variance) in velocity over a plurality of frames. If both values are above respective threshold levels, the object is considered suspicious and is removed from the object queue 71.

Conveniently, either/both of the above situations can be detected using a so-called motion factor $\zeta_m$ based on the ratio of positional variance to velocity variance. In order to take into account of both the x and y coordinates, the motion factor is preferably given by the following expression:

$$\zeta_m = \left( \frac{\sigma_{cx}^2}{\sigma_{vx}^2 + \tau} + \frac{\sigma_{cy}^2}{\sigma_{vy}^2 + \tau} \right) / 2 \quad (3)$$

where $\sigma_{cx}^2$ and $\sigma_{cy}^2$ are the positional changes in the x and y directions, respectively, $\sigma_{vx}^2$ and $\sigma_{vy}^2$ are the velocity variances in x and y directions, respectively, and $\tau$ is a predetermined constant which prevents the motion factor exploding in the event of the object remaining totally stationary (thereby making the denominator zero). In the present embodiment, a value of 0.1 is used for $\tau$.

The positional and velocity variance values for an object are preferably calculated on a frame-by-frame basis with respect to the object's position and velocity over a predetermined number of previously-captured frames. The number of frames can vary depending on the frame capture rate. For a capture rate of 25 frames per second, a window of between five and ten frames is suitable. If we use a window of five frames, for example, we calculate the variance of an object's centre point position in current frame t by subtracting its mean position over the previous five frames (t−1, t−2, t−3, t−4, t−5) from its current position. Likewise, we calculate the velocity variance by subtracting the mean velocity over the previous five frames from the last-recorded velocity. In this respect, it will be appreciated that the velocity represents the change in position between individual frames. When the next frame t+1 is received, the position and velocity variances for the object are calculated with respect to an updated window comprising frames t, t−1, t−2, t−3 and t−4.

The motion factor is compared with a predetermined threshold $T_\zeta$ to determine whether the movement of the object is regular or not, such that:

If $\zeta_m > T_\zeta$ motion is regular—not spurious
otherwise motion is irregular—spurious In this embodiment, the value of $T_\zeta$ is set to 2.5. This value is found to hold true for video capturing rates of 25 frames per second involving the monitoring of normal human and vehicle motion. For slow motion scenarios involving relatively constant motion, the value of $T_\zeta$ can be set higher to remove more noise. For fast motion scenarios with abrupt motion changes, the value of $T_\zeta$ should be set slightly lower than 2.5 to tolerate large velocity changes. In effect, two ranges of values are provided, the first, lower range indicating irregular object motion and the upper range indicating regular motion associated with a genuine foreground object.

In summary, this sub-stage is arranged to identify foreground objects whose motion between the current and previous frame is indicative of a spurious effect such as noise or random motion. This motion is compared with a sliding window of position characteristics recorded over a predetermined number of previous frames to determine the current positional and velocity variance in the x and y directions which, if outside predetermined limits, indicates the presence of an unwanted object that can be disregarded from subsequent tracking stages. If required, the system can suppress the display of said detected spurious objects by displaying pixels from the background model instead of those representing the spurious object.

Advanced Tracking Scheme

In the simple tracking scheme, it is assumed that objects appearing in the frame sequence will not be occluded by other objects, or disappear from view temporarily. For this reason, the state-transition management scheme of FIG. 14 requires only two main states, namely the 'new' and 'real' states, in order to decide whether an object should be tracked or deleted from the object queue. In most practical surveillance situations, however, objects may appear in, and disappear from, a scene at any place and at any time. An object may disappear for only a few frames before reappearing elsewhere. Multiple objects can move across a scene, occlude one another, and then split apart some time later. For this reason, there is provided an advanced tracking scheme utilising a complex state-transition management scheme in the fourth sub-stage 63. This state-transition management scheme is shown in FIG. 16.

Figure 16:
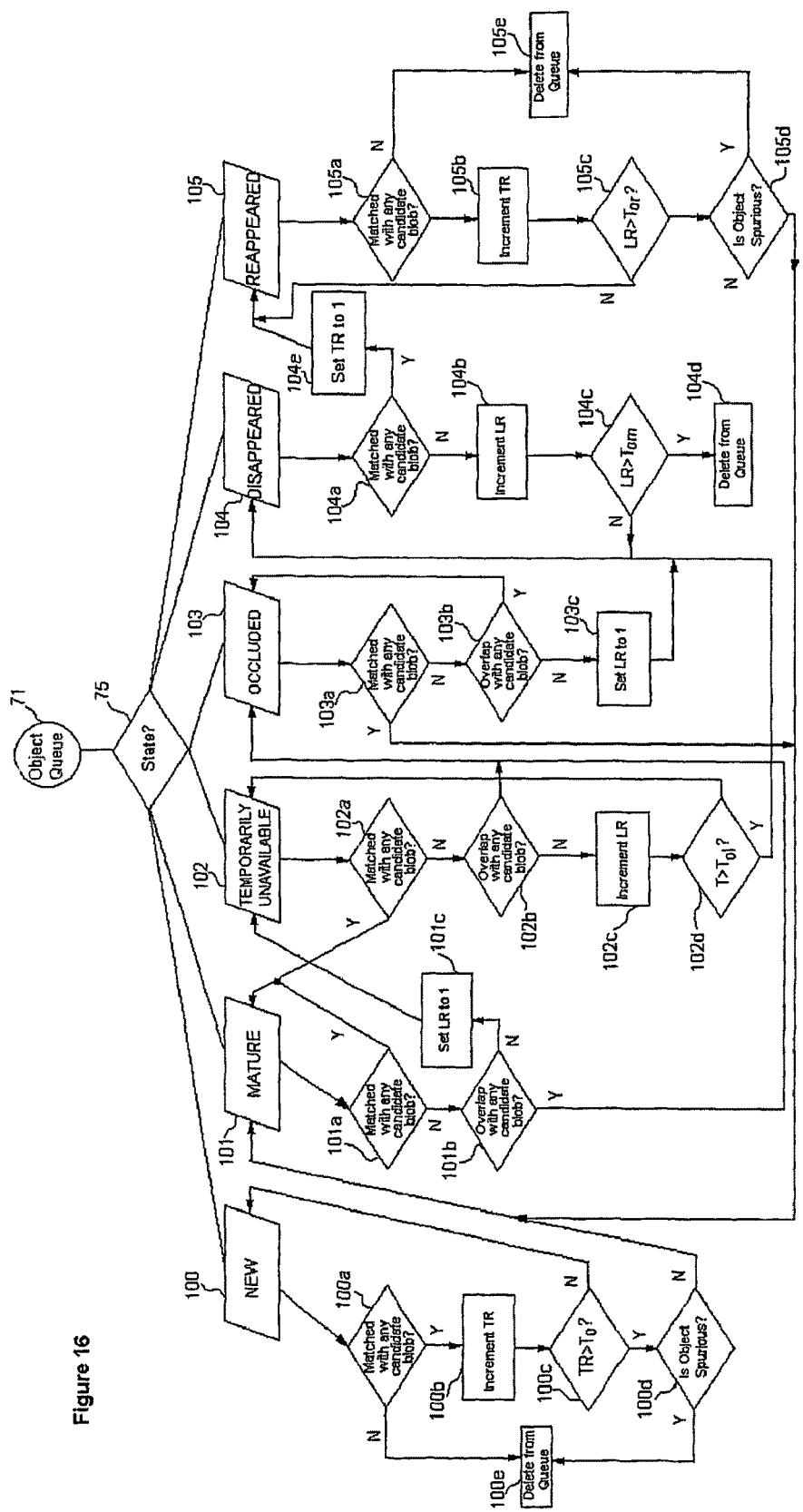
FIG. 16 is a flow chart showing relating to an advanced tracking scheme.

Referring to FIG. 16, it will be seen that each object in the object queue will occupy one of six main states, namely 'new' 100, 'mature' 101, 'temporarily unavailable' 102, 'occluded' 103, 'disappeared' 104 and 'reappeared' 105. For each incoming frame, objects in the object queue may maintain their status, change their status, or be deleted from the object queue. As in the management scheme of FIG. 14, each state employs a different tracking strategy to determine whether an object occupying that state should be tracked (i.e. have its motion trajectories recorded and displayed), deleted, and/or have its status changed to reflect how the object is behaving as new frames are received.

Each state of the management scheme will now be described in turn.

New 100 The object has just, or very recently, appeared in the scene. It is possible that the object is spurious, e.g. caused by random noise, and so it is necessary to accumulate confidence in the object before it can be accepted as a true foreground object. This is performed in a manner similar to that of the simple management scheme depicted in FIG. 13, namely by performing a matching operation in step 100a and incrementing the tracking record (TR) in the event of a match with an incoming blob mask. In step 100c, if the object is matched for a predetermined number of consecutive frames $T_o$, e.g. ten frames, then step 100d is entered in which the above-mentioned spurious identification test is performed. If no match is made in step 100a, or the object is considered spurious in step 100d, the object is removed from the object queue 80. If the object is not considered spurious in step 100d, the feature set for the object is updated so that its status becomes 'mature'.

Mature 101 The object has been accepted as a true foreground object. In this case, the video processing software displays a bounding box around the object on the video monitor 15. In addition, the motion of the object is tracked as additional frames are received and the trajectory information is stored and displayed on the video monitor 15. Provided the object continues to match incoming blob masks in step 101*a* then its status remains 'mature'. However, if no match is made then a test is performed in step 101*b* to determine whether the object overlaps another object in the object queue 80. This occurs if there is overlap between the two 'objects' bounding boxes. If this is the case, the object is updated so that its status is 'occluded'. If there is no overlap, a lost record (LR) parameter is set to '1' in step 101*c* and the object's status is updated to 'temporarily unavailable'.

Temporarily Unavailable 102 An object may be temporarily unavailable for a number of reasons.

Unavailable The object may be corrupted by noise, have disappeared behind another object, or simply exited the scene. If the object once again matches an incoming blob mask in step 102*a*, the object has re-entered the scene and so its status returns to 'mature'. If there is no match, the overlap test of step 101*b* is repeated in step 102*b* to test for occlusion. If this is negative, LR is incremented in step 102*c* and compared with a threshold value $T_{ol}$ in step 102*d*. $T_{ol}$ is the number of frames from which a mature object can be missing before the object is considered lost. Accordingly, if LR is above $T_{ol}$ then the status of the object is changed to 'disappeared'. If LR is below $T_{ol}$ then the status is maintained as 'temporarily unavailable'. In this state, the object is still tracked so that its trajectory information is stored and displayed.

Occluded 103 In this case, the object is overlapping other objects in the object queue. This can occur if, for example, the objects represent two or more people involved in a discussion or if one of them is standing behind the other. In this case, it may not be possible to extract and update individual feature descriptions. However, the bounding box feature of the object occluding the object of interest provides some constraints on its position. If, in step 103*a*, the object is matched with an incoming blob mask, then the status of the object is once again 'mature' indicating that the object has split away from the occluding object. If there is no match, step 103*b* determines whether the overlap still exists, in which case the object's 'occluded' status is maintained. If there is no overlap, LR is set to 1 in step 103*c* and the status is changed to 'disappeared'. As with the 'mature' and 'temporarily unavailable' states, the object is still tracked such that its trajectory information is stored and displayed.

Disappeared 104 If the status of an object reaches 'disappeared' this will reflect that the object has either completely exited the scene, or has become hidden behind a background object, e.g. by walking behind a tree or through the door of a building. If, in step 104*a*, the object is once again matched with an incoming blob mask, TR is set to 1 in step 104*e* and the status is updated to 'reappeared'. However, this must occur within a certain number of frames, as set by the threshold value $T_{OM}$. If no match is made in step 104*a*, LR is incremented in step 104*b* and compared against $T_{OM}$ in step 104*c*. If LR is greater than $T_{OM}$ the object is deleted from the object queue in step 104*d*. Otherwise, the status of the object is maintained as 'disappeared'. In this state, no trajectory information is recorded and/or displayed for the object.

Reappeared 105 In this state, an object previously classified as having 'disappeared' has, within a relatively short time, reappeared in the scene. This can occur if the object, having entered a building door for example, re-emerges from the door shortly afterwards. It is desirable to accumulate confidence in this object before returning its status to 'mature'. Accordingly, unless the reappeared object matches an incoming blob mask in step 105*a*, the object will be deleted from the object queue in step 105*e*. If matching does occur, TR is incremented in step 105*b* and compared with a further parameter $T_{or}$ in step 105*c*. Unless the object builds sufficient confidence for TR to exceed $T_{or}$ then its status remains 'reappeared'. If TR exceeds $T_{or}$ then step 105*d* is entered in which the above-mentioned spurious identification test is performed. If the object is considered spurious, it is deleted from the object queue 80. If not, the status of the object is updated to 'mature'. In the 'disappeared' state, no trajectory information is recorded and/or displayed for the object.

Additional Matching Costs for Advanced Tracking Scheme

Up to now, the first sub-stage 55 of the object tracking stage 5 has employed a single matching cost $C_{ob}$, as defined by equation (2), which generates a single correspondence list for analysis in the best match finding sub-stage 57. This matching cost $C_{ob}$ works adequately for both the simple and advanced tracking schemes. However, given the additional states provided for in the advanced tracking scheme, it is advantageous to provide a number of matching costs which take into account the characteristics of objects when they have a particular status. Therefore, in an alternative embodiment, three matching costs are provided, namely (i) $C_{ob}$, which is identical with equation (2), (ii) $C_{no\text{-}numpels}$, which is identical with equation (2) but does not take into account the $n_p^o$ feature of the feature set, and (iii) $C_{no\text{-}vel}$, which is identical with equation (2) but does not take into account the velocity feature $(v_x^o, v_y^o)$ of the feature set.

Instead of one correspondence list being generated by the first sub-stage 55, four correspondence lists are generated based on the following rules:

$L_{old}$—correspondence list containing all blob mask-object pairs where $C_{ob} < T_c$ and status≠'new';

$L_{new}$—correspondence list containing all blob mask-object pairs where $C_{ab} < T_c$ and status='new';

$L_{no\text{-}numpels}$—correspondence list containing all blob mask-object pairs where $C_{no\text{-}numpels} < T_c$ and status is 'mature', 'temporarily unavailable' or 'occluded'; and $L_{no\text{-}vel}$—correspondence list containing all blob mask-object pairs where $C_{no\text{-}vel} < T_c$ and status is 'mature', 'temporarily unavailable' or 'occluded'.

Where $T_c$ preferably has the same value as before, i.e. twelve.

In the first sub-stage 57, a global search is performed on each correspondence list in sequence, following the order of $L_{old}$, $L_{new}$, $L_{no\text{-}numpels}$ and $L_{no\text{-}vel}$. This sequence ensures that 'mature' objects, with which there is more confidence, are dealt with prior to 'new' objects.

The $L_{no\text{-}numpels}$ list comprises cost function values which, by virtue of $C_{no\text{-}numpels}$ not including information regarding the $n_p^o$ feature, are not significantly affected by sudden changes in the number of blob mask pixels. In this respect, it is possible for background subtraction errors, or partial occlusion situations, to cause a sudden change in the $n_p^o$ value which can, in turn, prevent a valid match being made. Such a situation can occur if a vehicle travels partially out of a scene and then returns shortly after.

The $L_{no\text{-}vel}$ list is used since, in the 'occluded' state, an object's features are will be updated by the Kalman filtering process. If we do not ignore the velocity feature $(v_x^o, v_y^o)$ then it is possible that the object will not be tracked if it splits away from the occluding object.

To prevent the $L_{no\text{-}numpels}$ and $L_{no\text{-}vel}$ correspondence lists being affected by spurious objects and noise, we restrict calculating the cost functions $C_{no\text{-}numpels}$ and $C_{no\text{-}vel}$ to objects have the status 'mature', 'temporarily unavailable' or 'occluded'.

The use of additional matching costs, together with the advanced tracking scheme, provides efficient and robust operation. Objects that are occluded or disappear temporarily can be tracked with improved reliability.

Figure 17:
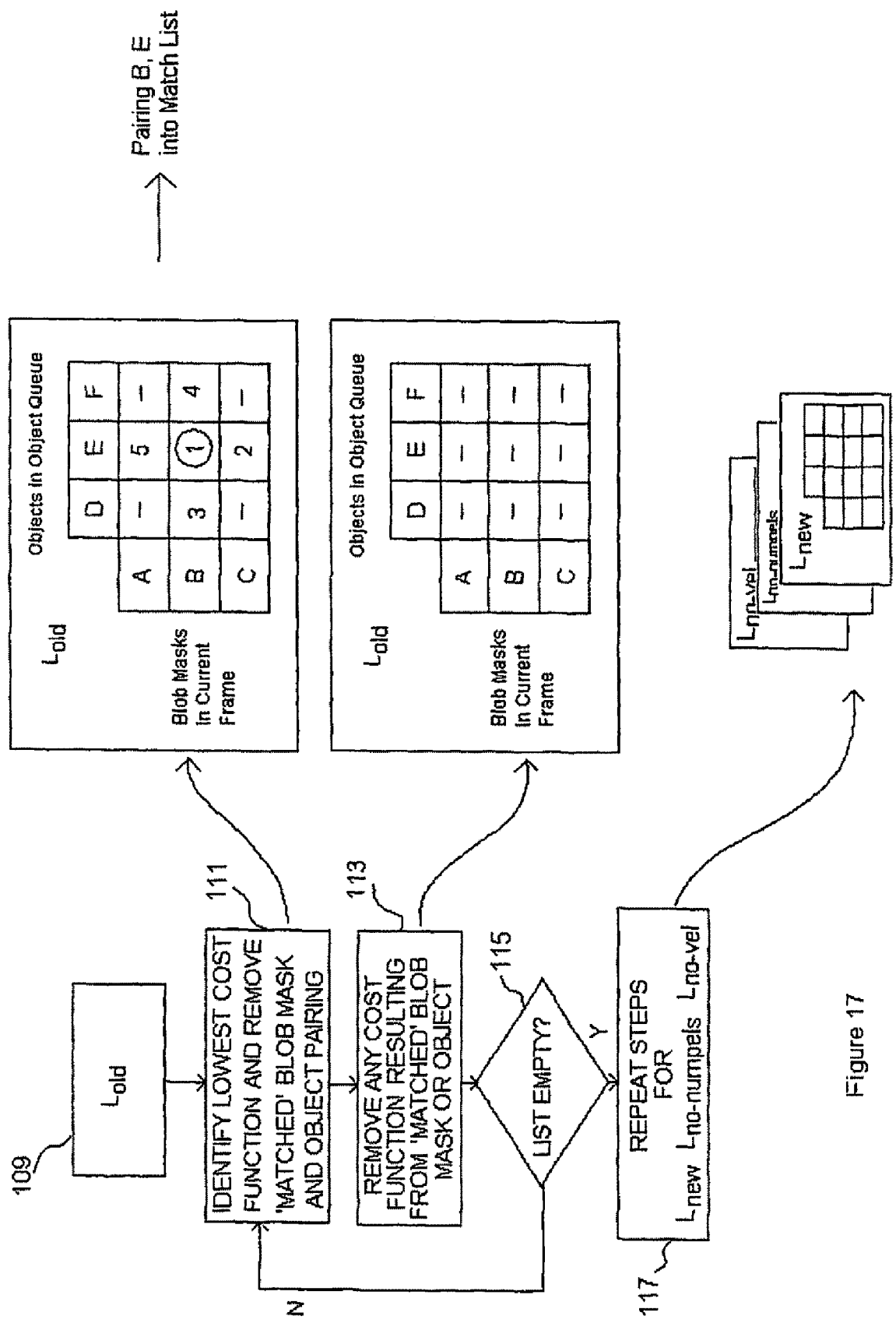
FIG. 17 is a flow chart showing a number of additional steps that may be performed in the matching cost processing sub-stage.

The sequence of steps performed for $L_{old}$, $L_{new}$, $L_{no\text{-}numpels}$ and $L_{no\text{-}vel}$ is shown in the flow chart of FIG. 17. The global search comprises acquiring $L_{old}$ (step 109), identifying the lowest cost function in the correspondence list and transferring the matched blob mask-object pairing to the match list (step 111), removing any remaining cost function resulting from the matched blob mask or object (step 113) and determining if the correspondence list is empty (step 115). If so, the next correspondence list is acquired in step 117 and the process repeats from step 109. If not, step 111 is repeated using the current correspondence list until it is empty. When each of the four correspondence lists is empty, the object queue is updated in the third sub-stage 59.

Initial Conditions

The above description of the object tracking stage 5 has assumed that at least one object is present in the object queue 71. However, when the video processing software is first operated, or there is no activity in the video scene, the object queue 71 will be empty. This means that when the set of blob masks is received by the object tracking stage 5, there will be no objects with which to compare them. In this case, the blob masks are entered into the object queue 71 as 'new' objects but are not processed by the state-transition management scheme in the fourth sub-stage 63. At the fifth sub-stage 65, the Kalman filter algorithm predicts and updates the positional features for each object. When the next frame is received, the object tracking stage 5 operates as previously described, the object queue 71 now including one or more objects with which to compare incoming blob masks.

Trajectory Information

Figure 18:
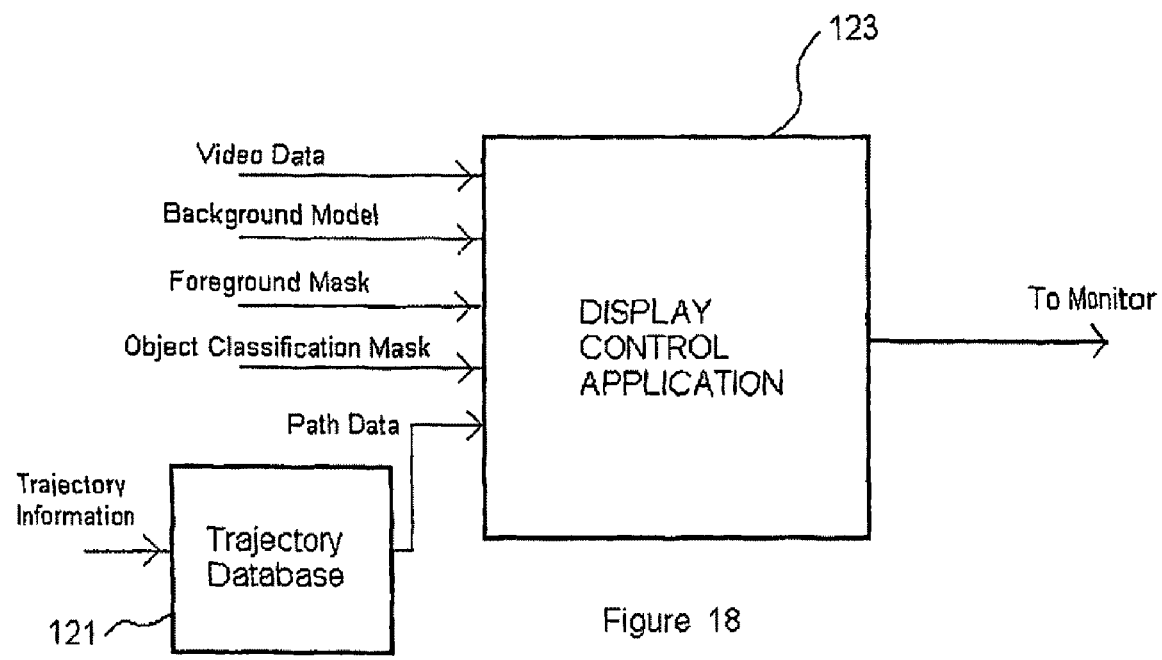
FIG. 18 is a block diagram of a trajectory database and a display control application.

For those blob masks which are classified as 'real' (in the simple tracking scheme) or 'mature', 'temporarily unavailable' or 'occluded' (in the advanced tracking scheme) trajectory information is generated by the object status update sub-stage 63. This trajectory information may comprise, for each tracked object, the Cartesian co-ordinates of its centre position, as well as the identity of the object to which it relates. Alternative forms of trajectory information could be generated, such as displacement or vector information. Referring to FIG. 18, the trajectory information is received by a first high-level application 121 which is a trajectory database. The trajectory database 121 stores the trajectory information and calculates therefrom, in real-time, the path taken by each object over the scene. The trajectory database 121 outputs path data which is received by a second high-level application 123, which is a display control application.

Figure 19:
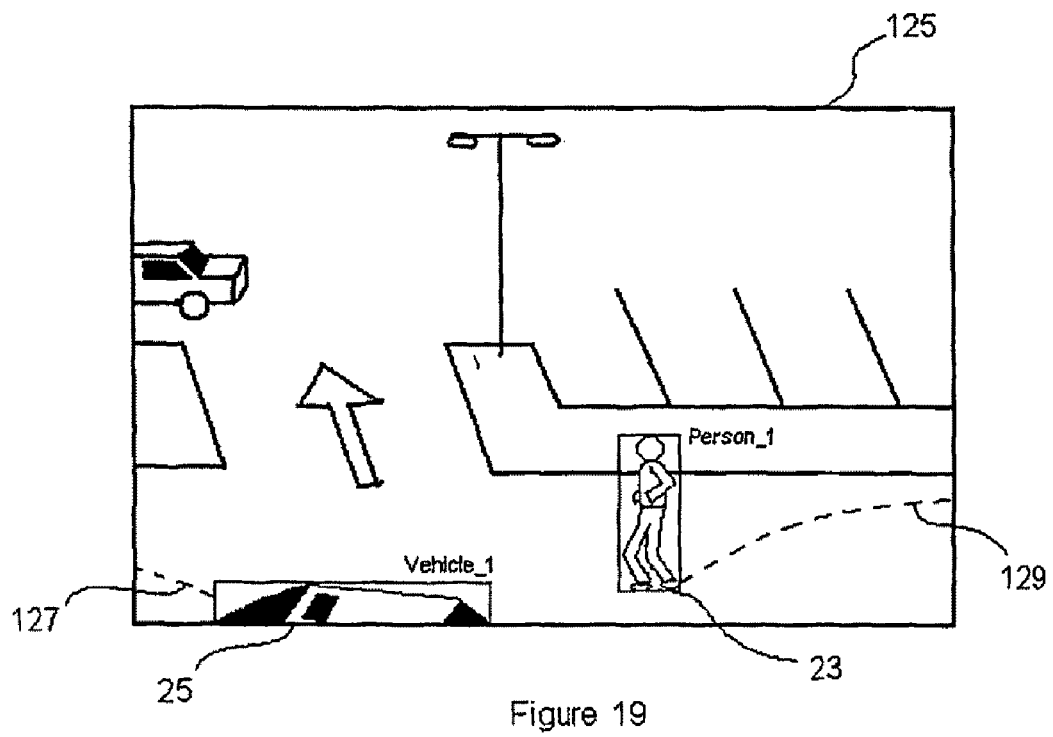
FIG. 19 is a representation of a post-processed video frame which shows tracking and object classification information thereon.

The display control application 123 controls the display of video data on the video monitor 1 stored on the hard drive of the PC 13. The display control application 70 is capable of receiving video data from all processing stages shown in FIG. 3, and is arranged to display any video sequence represented thereby, in real time or otherwise. An operator may view multiple images on a single screen. For example, an operator may wish to view both the background model 19 and the object classification mask 39 simultaneously. Of particular interest to an operator will be the path data from the trajectory database 121. A post-processed frame 125 from the display control application 123 is shown in FIG. 19. The blob masks corresponding to the foreground objects 23, 25 have been identified as 'real' and their trajectories recorded in the trajectory database 121. The resulting path data generates trail lines 129, 127 respectively representing the cumulative path taken by the objects over the course of a video segment leading up to the current frame. Although not visible in FIG. 19, the trajectory database also assigns a different colour to each trail line 129, 127 to indicate their association with different objects.

Further high level applications 7 may be provided. For example, an object classification application can compare the blob masks from the shadow removal stage 17 with templates of 'real-life' objects. In the event of a match, the object classification application can display a label identifying the object next to its bounding box, as shown in FIG. 19.

In summary, the object tracking stage 5 described above provides for improved object tracking by means of providing a state-transition object management scheme which classifies each object as having a particular state. The state to which an object is classified determines whether or not that object is tracked, i.e. whether or not its motion trajectory is recorded, and whether the current state is to be maintained or changed based on predefined rules particular to said current state.

Figure 20:
FIGS. 20a-20d show sequential frames of a first video sequence, the frames being useful for understanding the invention.
Figure 21:
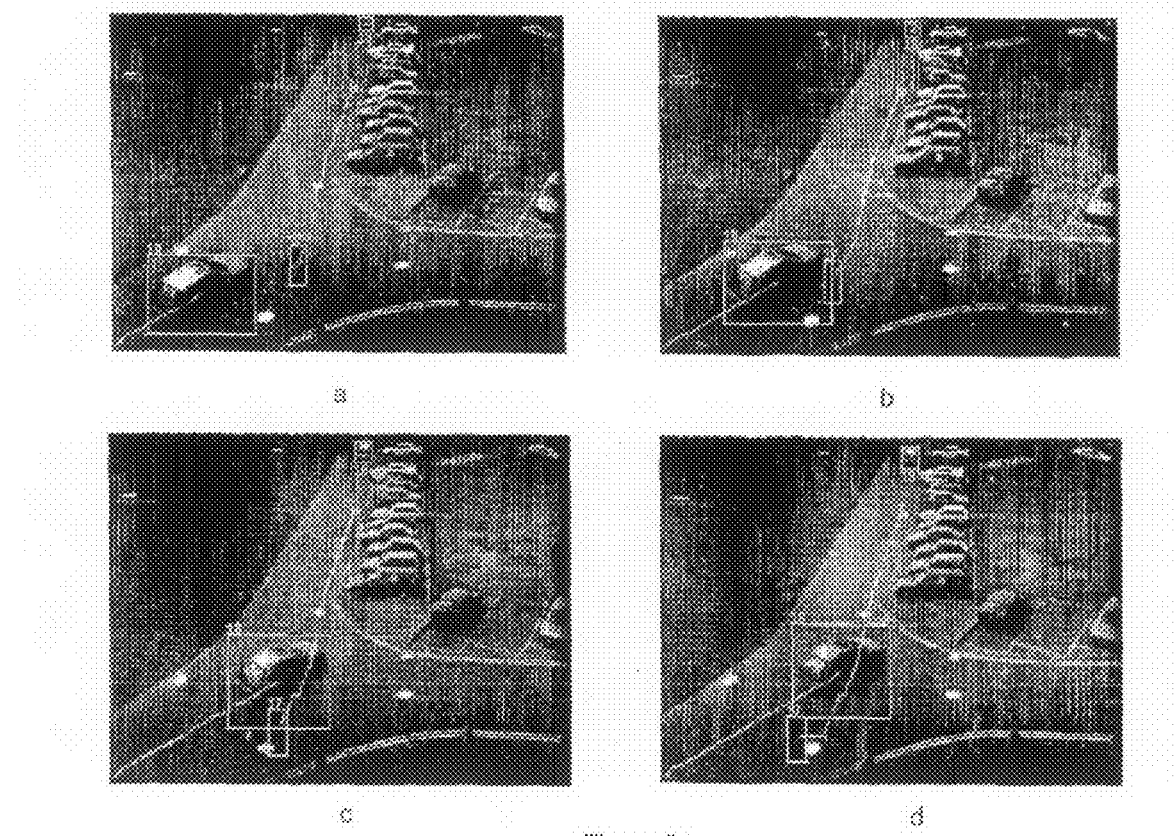
FIGS. 21a-21d show sequential frames of a second video sequence, the frames being useful for understanding the invention.
Figure 22:
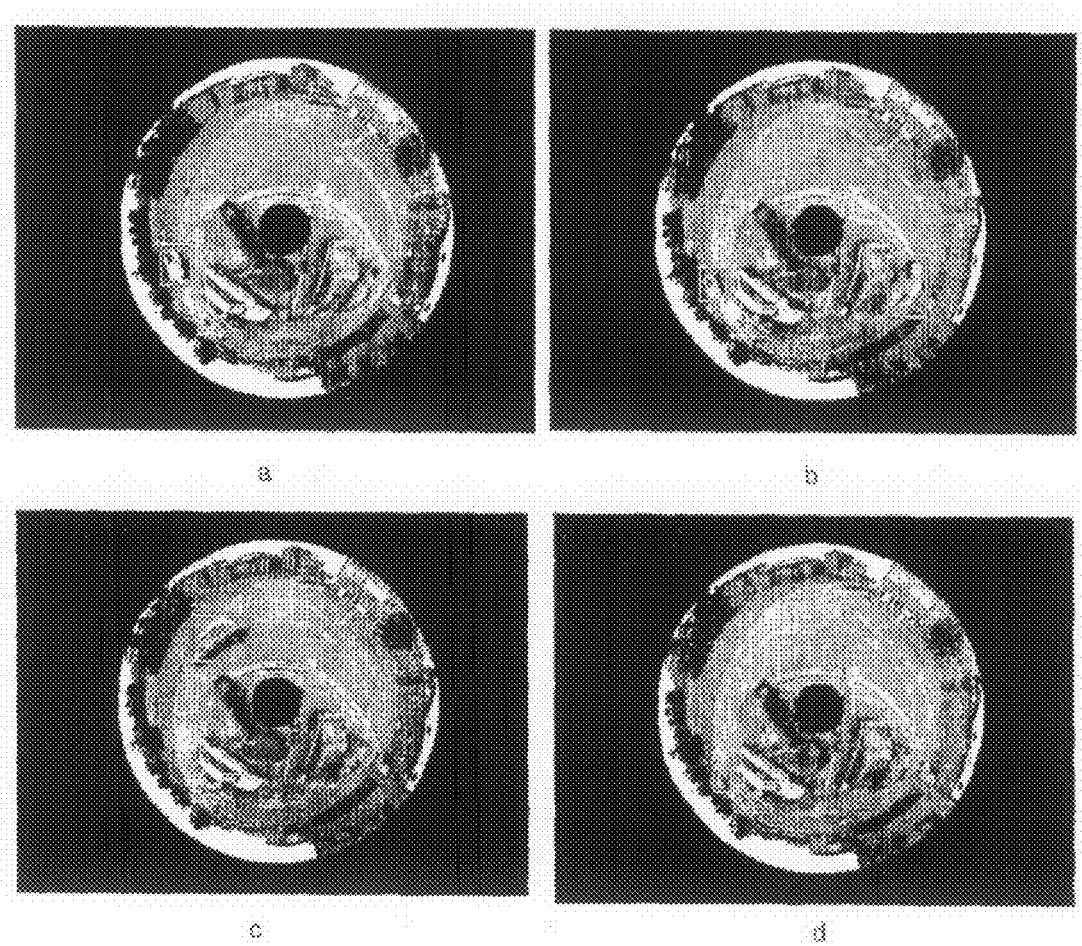
FIGS. 22a-22d show sequential frames of a first video sequence, the frames being useful for understanding the invention.

The performance of the intelligent video surveillance system 19 will be better appreciated by referring to FIGS. 20 to 22 which show the results from a number of practical situations. In each case, the above-described advanced tracking scheme was employed.

Referring to FIGS. 20a to 20b, four frames of a video sequence are shown. In FIG. 20a, a single object, namely a car, has been identified at the far left-hand side of the frame. At this time, the status parameter of the object is 'mature'. Identification is confirmed by the bounding box enclosing the car. In FIGS. 20b and 20c, the object begins to disappear from the edge of the frame. However, matching is performed using the $C_{no\text{-}numpels}$ cost function and so the sudden reduction in the number of pixels does not seriously affect the result. The status is maintained as 'mature' and the object continues to be tracked. In FIG. 20d, the object comes back into view and is still being tracked.

Referring to FIGS. 21a to 21d, four frames of a further video sequence are shown. In FIG. 21a, first and second objects have been identified towards the bottom left of the frame. At this time, the status parameter of each object is 'mature'. In FIGS. 21b and 21c, the two objects move close to one another, causing their respective bounding boxes to overlap. In this case, the status parameter of the larger object is maintained as 'mature' whilst that of the smaller object is changed to 'occluded'. This is because the merged blob more closely resembles the bounding box of the larger object. However, the Kalman filter continues to predict the position of the smaller object based on its current feature set. Further, matching is performed using the $C_{no\text{-}vel}$ cost function which disregards the velocity feature of the smaller object, and so a match is made with the subsequent frame and the status parameter re-enters the 'mature' state. At no point has tracking stopped and both objects are correctly tracked until their bounding boxes separate, as shown in FIG. 21d.

Finally, referring to FIGS. 22a to 22d, four frames of a yet further video sequence are shown. In this case, the video sequence is captured using a camera with a fish eye lens, the use of such cameras being commonplace in modern video surveillance systems. In FIG. 21a, a first object is identified towards the left-hand side of the frame, namely a moving vehicle. A second object, namely a vehicle located towards the right-hand side of the frame, has started to move. However, this object is classified as 'new' since it has not yet been matched in ten consecutive frames. In FIG. 21b, the first object continues being matched, and therefore tracked, despite its size changing dramatically due to the distortion of the fish-eye lens. At this stage, the second object has been matched for over ten consecutive frames and so is classified as a 'mature' object. The second object's bounding box is therefore visible. In FIG. 21c, the first object is no longer visible in the frame and so its status is changed to 'disappeared'. The second object continues to move and so its status is maintained as 'mature' and it continues to be tracked. This is despite the fact that its motion appears to be parabolic due to the distortion of the fish eye lens. In FIG. 11d, tracking of the second object continues as before and is not affected by the changing shape of the object.

The invention claimed is:

1. A method for selectively tracking an object appearing in a video sequence comprising a plurality of frames, each frame comprising a plurality of pixels, the method comprising:
    (a) identifying a first object in a first frame and associating therewith a first status parameter indicative of a non-tracking condition;
    (b) identifying a plurality of candidate objects in a subsequent frame and determining whether there is a correspondence between any one of the candidate objects and the first object;
    (c) in the event of correspondence between a candidate object and the first object, repeating step (b) for that candidate object over subsequent frames until a predetermined number of sequential correspondences are identified;
    (d) changing the first status parameter to a second status parameter when said predetermined number of sequential correspondences are identified; and
    (e) in response to the change from first to second status parameter, recording the intra-frame position of said object for subsequent frames;
    wherein correspondence is determined in step (b) by:
    calculating a first similarity score between each candidate object and the first object using a first cost function, calculating a second similarity score using a second cost function which is different from the first cost function, grouping the calculated similarity scores in accordance with the status parameter of the first object, analyzing each group in a predetermined order and selecting the closest match between the candidate objects and the first object.

2. The method according to claim 1, wherein, following step (d), step (b) is repeated for a candidate object in the next frame and, in the event that no correspondence is identified between the first object and said candidate object, the second status parameter is changed to one of a plurality of further parameters in accordance with a transition rule associated with said second status parameter.

3. The method according to claim 1, wherein the transition rule determines whether the first object has disappeared or merged with another candidate object in the frame.

4. The method according to claim 1, further comprising, in step (e), modifying the appearance of said subsequent frames to provide a visual indication of the intra-frame position of said object.

5. The method according to claim 4, wherein subsequent frames are modified so as to display each intra-frame position recorded in step (e) so as to provide a trail line indicating movement of said object in said subsequent frames.

6. The method according to claim 1, wherein, step (d) comprises changing the first status parameter to the second status parameter when (i) said sequential correspondences are identified and (ii) position characteristics of the object meet a set of predefined criteria.

7. The method according to claim 6, wherein step (ii) comprises assigning a motion factor $\zeta_m$ to the first object based on its position characteristics over a plurality of frames, and classifying said first object as meeting the predefined criteria if the motion factor is above a predetermined threshold $T_\zeta$.

8. The method according to claim 7, wherein the motion factor $\zeta_m$ is given by:

$$\zeta_m = \left( \frac{\sigma_{cx}^2}{\sigma_{vx}^2 + \tau} + \frac{\sigma_{cy}^2}{\sigma_{vy}^2 + \tau} \right) / 2$$

where $\sigma_{cx}^2$ and $\sigma_{cy}^2$ are the positional variances of the first object in the x and y directions, respectively, $\sigma_{vx}^2$ and $\sigma_{cy}^2$ are the velocity variances in x and y directions, respectively, and $\tau$ is a predetermined constant.

9. The method according to claim 1, further comprising providing a first set of data representing appearance features $f_i^o$ of the first object, and extracting, for the candidate object in the subsequent frame, a second set of data representing appearance features $f_i^b$ of that object, step (b) comprising combining the first set of appearance data with the second set of appearance data in a cost function $C_{ob}$ thereby to generate a numerical parameter indicating the degree of correspondence between the first object and the or each new candidate region.

10. The method according to claim 9, wherein the cost function is given by the following expression:

$$C_{ob} = \sqrt{\sum_{i=1}^{n} \frac{(f_i^o - f_i^b)^2}{\sigma_i^2}}$$

where $f_i^o$ represents an appearance feature of the first object, $f_i^b$ represents an appearance feature of the candidate region, $\sigma_i^2$ is the variance of $f_i^o$ over a predetermined number of frames and n is the number of appearance features in the first and second data sets.

11. The method according to claim 9, wherein the appearance features of the first object and candidate object include features relating to the frame position of the object/candidate object, and features relating to the shape of the object/candidate object.

12. The method according to claim 11, wherein in the event of a correspondence being identified in step (b), the appearance features $f_i^o$ of the first object are updated using the appearance features $f_i^b$ of the candidate object to which the first object corresponds.

13. A non-transitory computer-readable storage medium storing a set of instructions to cause a computer to perform steps for selectively tracking an object appearing in a video sequence comprising a plurality of frames, each frame comprising a plurality of pixels, the steps comprising:
    (a) identifying a first object in a first frame and associating therewith a first status parameter indicative of a non-tracking condition;
    (b) identifying a plurality of candidate objects in a subsequent frame and determining whether there is a correspondence between any one of the candidate objects and the first object,
    (c) in the event of correspondence between a candidate object and the first object, repeating step (b) for that candidate object over subsequent frames until a predetermined number of sequential correspondences are identified;

(d) changing the first status parameter to a second status parameter when said predetermined number of sequential correspondences are identified; and (e) in response to the change from first to second status parameter, recording the intra-frame position of said object for subsequent frames;

wherein correspondence is determined in step (b) by:

calculating a first similarity score between each candidate object and the first object using a first cost function, calculating a second similarity score using a second cost function which is different from the first cost function, grouping the calculated similarity scores in accordance with the status parameter of the first object, analysing each group in a predetermined order and selecting the closest match between the candidate objects and the first object.

14. A video processing system for selectively tracking an object appearing in a video sequence comprising a plurality of frames, each frame comprising a plurality of pixels, the system being arranged, in use, to:

(a) identify a first object in a first frame and associating therewith a first status parameter indicative of a non-tracking condition;

(b) identify a plurality of candidate objects in a subsequent frame and determining whether there is a correspondence between any one of the candidate objects and the first object;

(c) in the event of correspondence between a candidate object and the first object, repeat step (b) for that candidate object over subsequent frames until a predetermined number of sequential correspondences are identified;

(d) change the first status parameter to a second status parameter when said predetermined number of sequential correspondences are identified;

(e) in response to the change from first to second status parameter, record the intra-frame position of said object for subsequent frames; and calculate a first similarity score between each candidate object and the first object using a first cost function, calculate a second similarity score using a second cost function which is different from the first cost function, group the calculated similarity scores in accordance with the status parameter of the first object, analyze each group in a predetermined order and select the closest match between the candidate objects and the first object.

15. A method of classifying an object in a video sequence comprising a plurality of frames, the method comprising:

(a) identifying a first object in a first frame and associating therewith a status parameter having one of a plurality of predetermined states, each state having a different transition rule associated therewith;

(b) identifying at least one candidate object in a subsequent frame;

(c) comparing the at least one candidate object with the first object to determine if there is a correspondence therebetween; and (d) updating the status parameter of the first object in accordance with its associated transition rule, said transition rule indicating which of the predetermined states the status parameter should be transited to dependent on whether a correspondence was identified in step (c)

wherein correspondence in step (c) is determined by:

calculating a first similarity score between each candidate object and the first object using a first cost function, calculating a second similarity score using a second cost function which is different from the first cost function, grouping the calculated similarity scores in accordance with the status parameter of the first object, analyzing each group in a predetermined order and selecting the closest match between the candidate objects and the first object.

16. The method according to claim 15, further comprising repeating steps (b) to (d) for a plurality of subsequent frames of the video sequence.

17. The method according to claim 15, wherein the transition rule associated with the state causes the status parameter to maintain its current state if there is no correspondence identified in step (c).

18. The method according claim 15, wherein the status parameter has a new state and a real state, the transition rule associated with the new state causing the status parameter to be changed to the real state in the event that a correspondence is identified in step (c), the method further comprising the step of recording the position change between the first object and the corresponding candidate region only when the status parameter is in the real state.

19. The method according to claim 18, wherein the status parameter is changed to the real state only if a correspondence is identified in a plurality of sequential frames in step (c).

20. A video processing apparatus comprising:

an input for receiving frames of a video sequence;

an object queue arranged to store data representing objects identified in one or more frames and, associated with each object, a status parameter representing one of a plurality of predetermined states;

a video analysis unit arranged to receive a frame having one or more candidate objects therein, and to determine whether the or each candidate object matches an object in the object queue; and a state transition controller arranged to update the status parameter of each object in the object queue in accordance with a transition rule corresponding to the state of the object's status parameter, said transition rule indicating which of the predetermined states the status parameter should be transited to;

wherein the video analysis unit is further arranged to:

calculate a first similarity score between each candidate object and the first object using a first cost function, calculate a second similarity score using a second cost function which is different from the first cost function, group the calculated similarity scores in accordance with the status parameter of the first object, analyse each group in a predetermined order and select the closest match between the candidate objects and the first object.

21. Apparatus according to claim 20, wherein the status parameter represents one of a new and real state, the state transition controller being arranged to transit the status parameter from the new state to the real state if the video analysis unit determines that a match is made between an object in the object queue and a candidate object in the received frame.

22. Apparatus according to claim 21, wherein the video analysis unit is further arranged to record the change in frame position of an object in the object queue and a candidate object to which it is matched in the event that the state transition controller updates the status parameter, associated with said object, to the real state.

23. Apparatus according to claim 22, further comprising a display controller arranged to display, on a video display unit, a path line indicative of the change in frame position.

24. A method for tracking an object appearing in a video sequence comprising a plurality of frames, each frame comprising a plurality of pixels, the method comprising:
   (a) identifying a first object in a first frame and associating therewith a first status parameter indicative of a non-tracking condition;
   (b) identifying a candidate object in a subsequent frame and determining whether there is a correspondence between the candidate object and the first object;
   (c) in the event of correspondence, repeating steps (b) and (c) for further subsequent frames until a predetermined number of sequential correspondences are identified;
   (d) changing the first status parameter to a second status parameter when said sequential correspondences are identified; and
   (e) in response to the change from first to second status parameter, recording the intra-frame position of said object for subsequent frames;
   wherein, step (d) comprises changing the first status parameter to the second status parameter when (i) said sequential correspondences are identified and (ii) position characteristics of the object meet a set of predefined criteria; and
   wherein step (ii) comprises assigning a motion factor $\zeta_m$ to the first object based on its position characteristics over a plurality of frames, and classifying said first object as meeting the predefined criteria if the motion factor is above a predetermined threshold $T_\zeta$.

25. A method for tracking an object appearing in a video sequence comprising a plurality of frames, each frame comprising a plurality of pixels, the method comprising:
   (a) identifying a first object in a first frame and associating therewith a first status parameter indicative of a non-tracking condition;
   (b) identifying a candidate object in a subsequent frame and determining whether there is a correspondence between the candidate object and the first object;
   (c) in the event of correspondence, repeating steps (b) and (c) for further subsequent frames until a predetermined number of sequential correspondences are identified;
   (d) changing the first status parameter to a second status parameter when said sequential correspondences are identified;
   (e) in response to the change from first to second status parameter, recording the intra-frame position of said object for subsequent frames; and
   providing a first set of data representing appearance features $f_i^o$ of the first object, and extracting, for the candidate object in the subsequent frame, a second set of data representing appearance features $f_i^b$ of that object, step (b) comprising combining the first set of appearance data with the second set of appearance data in a cost function $C_{ob}$ thereby to generate a numerical parameter indicating the degree of correspondence between the first object and the or each new candidate region.

* * * * *